(12) United States Patent
Inoue et al.

(10) Patent No.: US 11,986,909 B2
(45) Date of Patent: *May 21, 2024

(54) FLUX AND SOLDER PASTE

(71) Applicant: SENJU METAL INDUSTRY CO., LTD., Tokyo (JP)

(72) Inventors: Kenta Inoue, Tokyo (JP); Nanako Miyagi, Tokyo (JP); Tomoko Nagai, Tokyo (JP); Kazuyori Takagi, Tokyo (JP); Akiko Takaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/036,940

(22) PCT Filed: Nov. 17, 2021

(86) PCT No.: PCT/JP2021/042217
§ 371 (c)(1),
(2) Date: May 15, 2023

(87) PCT Pub. No.: WO2022/107802
PCT Pub. Date: May 27, 2022

(65) Prior Publication Data
US 2023/0321767 A1    Oct. 12, 2023

(30) Foreign Application Priority Data

Nov. 18, 2020  (JP) ................. 2020-192036
May 28, 2021  (JP) ................. 2021-090226

(51) Int. Cl.
  *B23K 35/36*  (2006.01)
  *B23K 35/362*  (2006.01)
(52) U.S. Cl.
  CPC ........ *B23K 35/3613* (2013.01); *B23K 35/362* (2013.01)

(58) Field of Classification Search
  CPC .......................... B23K 35/3613; B23K 35/362
  See application file for complete search history.

(56) References Cited

U.S. PATENT DOCUMENTS 4,619,715 A * 10/1986 Hwang ................. B23K 35/36
148/26

FOREIGN PATENT DOCUMENTS

| CN | 101905394 | 12/2010 |
| CN | 102170994 | 8/2011 |

(Continued)

OTHER PUBLICATIONS

International Search Report for App. No. PCT/JP2021/042217, dated Jan. 18, 2022 (4 pages).

(Continued)

*Primary Examiner* — Scott R Kastler
(74) *Attorney, Agent, or Firm* — NIXON PEABODY LLP; Jeffrey L. Costellia

(57) ABSTRACT

The present invention uses a flux containing a rosin, a solvent, a thixo agent, and an activator. The thixo agent contains a polyamide and a compound represented by general formula (1). The polyamide is a condensate between an amine and at least one selected from aliphatic carboxylic acids and hydroxy group-containing aliphatic carboxylic acids, and has an endothermic peak at a temperature of 120-200° C. In the general formula, $R^{11}$ represents a hydrocarbon group having 11-30 carbon atoms. $R^{0a}$ represents a hydrogen atom or a hydrocarbon group having 12-31 carbon atoms. $R^{0b}$ represents an n-valent hydrocarbon group having 4-12 carbon atoms. $R^{21}$ represents an alkylene group having 2-6 carbon atoms. $R^{0c}$ represents a single bond or an alkylene group having 2-6 carbon atoms. n represents 1 or 2. When n represents 1, m represents an integer of 1-3. When n represents 2, m represents 1.

(Continued)

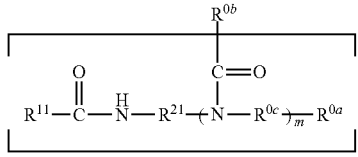

(1)

3 Claims, 4 Drawing Sheets

(56) References Cited

FOREIGN PATENT DOCUMENTS

| CN | 102528326 A | 7/2012 |
|---|---|---|
| CN | 102770232 A | 11/2012 |
| CN | 103586602 A | 2/2014 |
| CN | 104220210 | 12/2014 |
| CN | 106825995 | 6/2017 |
| CN | 108274155 A | 7/2018 |
| CN | 111372718 A | 7/2020 |
| JP | H05-271585 A | 10/1993 |
| JP | 07-75894 | 3/1995 |
| JP | 10328882 A | 12/1998 |
| JP | 2005-144520 | 6/2005 |
| JP | 2008302407 A | 12/2008 |
| JP | 2009-154170 | 7/2009 |
| JP | 2018-015789 | 2/2018 |
| JP | 6575706 B1 | 9/2019 |
| JP | 6575713 B1 | 9/2019 |
| JP | 2019-210439 | 12/2019 |
| JP | 2020-040105 | 3/2020 |
| JP | 2020-044562 | 3/2020 |
| JP | 7137097 B2 | 9/2022 |
| TW | 201940276 | 10/2019 |
| WO | 2011080990 A1 | 7/2011 |
| WO | WO-2017/065076 | 4/2017 |
| WO | WO-2019/172410 | 9/2019 |

OTHER PUBLICATIONS

International Search Report for App. No. PCT/JP2021/042228, dated Jan. 18, 2022 (4 pages).
Japanese Office Action for JP App. No. 2020-192036, dated Mar. 26, 2021 (6 pages).
Taiwanese Office Action for TW App. No. 110142772, dated Jun. 9, 2022 (10 pages).
Chinese Office Action for App. No. 202180076793.3, mailed Oct. 23, 2023 (7 pages) Partial Translation.
Indian Office Action for App. No. 202337033347, mailed Dec. 13, 2023 (5 pages).
Chinese Notice of Allowance for Application No. 202180076792.9, mailed Jan. 2, 2024, (9 pages).
EP Search Report for App. No. 21894679.6 dated Apr. 2, 2024 (4 pages).

\* cited by examiner

FLUX AND SOLDER PASTE

TECHNICAL FIELD

The present invention relates to a flux and a solder paste using the flux.

Priority is claimed on Japanese Patent Application No. 2020-192036 filed on Nov. 18, 2020 and Japanese Patent Application No. 2021-090226 filed on May 28, 2021, the contents of which are incorporated herein.

BACKGROUND ART

A flux used for soldering has an effect of chemically removing metal oxides present on a solder, and a metal surface of an object to be joined, which is a soldering target, thereby enabling the movement of metal elements at a boundary between two objects to be joined. Therefore, by performing soldering using the flux, an intermetallic compound is formed between the solder, and thereby, strong joining can be obtained. Such a flux generally contains a resin component, a solvent, an activator, a thixotropic agent, and the like.

A solder paste is a composite material obtained by mixing solder alloy powder and a flux. In soldering using the solder paste, first, the solder paste is printed on a substrate, and components are mounted on the substrate. Subsequently, the substrate on which the components are mounted is heated in a heating furnace referred to as a reflow furnace.

In the reflow furnace, preheating is performed, and then main heating for melting the solder alloy powder is performed. There is a case where the solder paste printed on the substrate softens during preheating and causes heating sagging. Heating sagging causes mounting defects such as solder balls and solder bridges.

In contrast, for example, a flux containing a hydride of an alcohol-modified dicyclopentadiene-based resin has been proposed in order to suppress heating sagging at a preheating temperature of 150° C. to 160° C. (refer to Patent Document 1).

CITATION LIST

Patent Document

[Patent Document 1]
Japanese Unexamined Patent Application, First Publication No. 2009-154170

SUMMARY OF INVENTION

Technical Problem

In soldering, in a case where the substrate has a large area, it is required to further increase the preheating temperature in order to suppress temperature variations in the substrate. However, in a case where the preheating temperature is set to 180° C. to 190° C., for example, in the flux disclosed in Patent Document 1, it is not possible to sufficiently suppress heating sagging.

Therefore, an object of the present invention is to provide a flux and a solder paste which are capable of sufficiently suppressing heating sagging during reflow.

Solution to Problem

In order to achieve the above-mentioned object, the present invention adopts the following constitution.

That is, a first aspect of the present invention is a flux containing: a rosin, a solvent, a thixotropic agent, and an activator, in which the thixotropic agent contains a compound represented by General Formula (1) and a polyamide, the polyamide is a condensate of one or more selected from the group consisting of an aliphatic carboxylic acid and a hydroxy group-containing aliphatic carboxylic acid and an amine, and the temperature of the endothermic peak of the polyamide by differential scanning calorimetry is 120° C. or higher and 200° C. or lower.

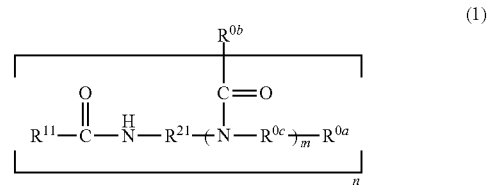

[In the formula, $R^{11}$ represents a hydrocarbon group having 11 to 30 carbon atoms which may have a substituent. $R^{0a}$ represents a hydrocarbon group having 12 to 31 carbon atoms which may have a substituent or a hydrogen atom. $R^{0b}$ represents an n-valent hydrocarbon group having 4 to 12 carbon atoms which may have a substituent. $R^{21}$ represents an alkylene group having 2 to 6 carbon atoms. $R^{0c}$ represents an alkylene group having 2 to 6 carbon atoms or a single bond. n is 1 or 2; When n is 1, m is an integer of 1 to 3. When n is 2, m is 1.]

In the flux according to the first aspect, the polyamide is preferably a condensate of an aliphatic carboxylic acid, a hydroxy group-containing aliphatic carboxylic acid, and an amine.

In addition, in the flux according to the first aspect, the aliphatic carboxylic acid preferably includes a dicarboxylic acid.

In addition, in the flux according to the first aspect, the amount of a compound represented by General Formula (1) is preferably 1% by mass or more and 10% by mass or less with respect to a total mass of the flux.

In addition, in the flux according to the first aspect, the compound represented by General Formula (1) is preferably a compound represented by the General Formula (3).

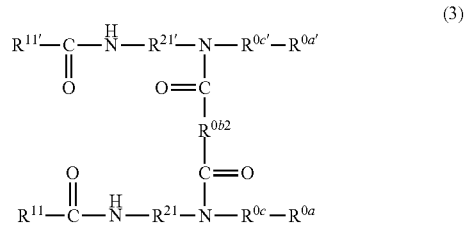

[In the formula, $R^{11}$ and $R^{11'}$ each independently represent a hydrocarbon group having 11 to 30 carbon atoms which may have a substituent. $R^{0a}$ and $R^{0a'}$ each independently represent a hydrocarbon group having 12 to 31 carbon atoms which may have a substituent or a hydrogen atom. $R^{0b2}$ represents a hydrocarbon group having 4 to 12 carbon atoms which may have a substituent. $R^{21}$ and $R^{21'}$ each independently represent an alkylene group having 2 to 6 carbon atoms. $R^{0c}$ and $R^{0c'}$ each independently represent an alkylene group having 2 to 6 carbon atoms or a single bond.]

In addition, in the flux according to the first aspect, the compound represented by General Formula (3) is preferably N,N'-bis(2-stearamidoethyl)-sebacamide or N,N'-bis(2-stearamidoethyl)-azelicamide.

In addition, in the flux according to the first aspect, the amount of the rosin is preferably 30% by mass or more and 50% by mass or less with respect to a total mass of the flux.

In addition, a second aspect of the present invention is a solder paste containing solder alloy powder and the flux according to the first aspect.

Advantageous Effects of Invention

According to the present invention, it is possible to provide a flux and a solder paste that are capable of sufficiently suppressing heating sagging during reflow.

DESCRIPTION OF EMBODIMENTS (Flux)

Figure 1:
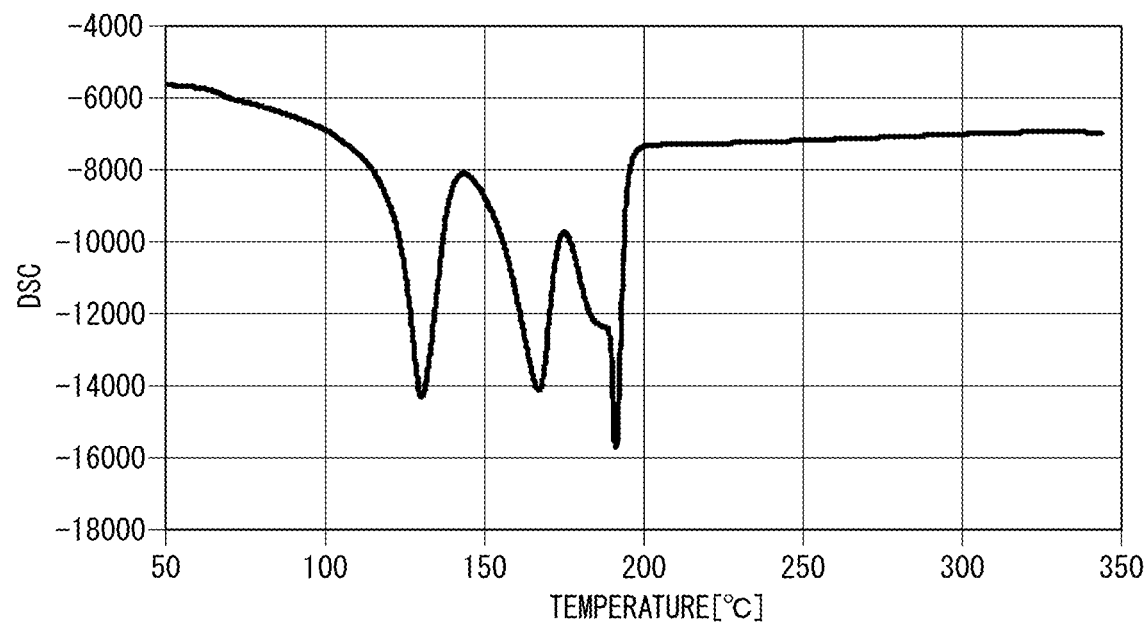
FIG. 1 is a diagram showing a DSC curve of a polyamide contained in a flux according to an embodiment of the present invention.

A flux of the present embodiment contains rosin, a solvent, a thixotropic agent, and an activator.

<Rosin>

As the rosin, raw material rosin such as gum rosin, wood rosin, and tall oil rosin, and derivatives obtained from the raw material rosin are exemplary examples.

As the derivatives, purified rosin, hydrogenated rosin, disproportionated rosin, polymerized rosin, acid-modified rosin, acid-modified hydrogenated rosin, phenol-modified rosin, and α,β-unsaturated carboxylic acid-modified products (acrylated rosin, maleated rosin, fumarated rosin, and the like), and purified products, hydrides, and disproportionated products of the polymerized rosin, purified products, hydrides, and disproportionated products of the α,β-unsaturated carboxylic acid-modified products, and the like are exemplary examples.

For the rosin, one type may be used alone, or two or more types may be mixed together and used.

As the rosin, among these, it is preferable to use one or more selected from the group consisting of polymerized rosin, acid-modified hydrogenated rosin, and hydrogenated rosin.

As the acid-modified hydrogenated rosin, it is preferable to use acrylic acid-modified hydrogenated rosin.

The amount of the rosin in the flux is preferably 30% by mass or more and 50% by mass or less, more preferably 35% by mass or more and 50% by mass or less, and further more preferably 40% by mass or more and 50% by mass or less with respect to the total amount (100% by mass) of the flux.

<Solvent>

In the flux of the present embodiment, as the solvent, water, alcohol solvent, glycol ether solvent, terpineol, and the like are exemplary examples.

As the alcohol solvent, isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanol, 1,4-cyclohexanediol, 1,4-cyclohexanedimethanol, 2,4,7,9-tetramethyl-5-decyne-4,7-diol, and the like are exemplary examples.

As the glycol ether solvent, diethylene glycol mono-2-ethylhexyl ether, ethylene glycol monophenyl ether, diethylene glycol monohexyl ether, diethylene glycol dibutyl ether, triethylene glycol monobutyl ether, methyl propylene triglycol, butyl propylene triglycol, triethylene glycol butylmethyl ether, tetraethylene glycol dimethyl ether, and the like are exemplary examples.

As the solvent, it is preferable to use a glycol ether solvent, and more preferable to use diethylene glycol monohexyl ether.

For the solvent, one type may be used alone, or two or more types may be mixed together and used.

The amount of the solvent in the flux is preferably 30% by mass or more and 60% by mass or less, and more preferably 30% by mass or more and 45% by mass or less with respect to the total amount (100% by mass) of the flux.

<Thixotropic Agent>

In the flux of the present embodiment, the thixotropic agent contains a compound represented by General Formula (1) and a specific polyamide (PA1).

Compound Represented by General Formula (1)>>

In the flux of the present embodiment, a compound represented by General Formula (1) is used.

$$R^{11}-\overset{O}{\underset{\|}{C}}-\overset{H}{\underset{}{N}}-R^{21}-\left[\overset{R^{0b}}{\underset{}{N}}-R^{0c}\right]_{m}-R^{0a} \quad (1)$$

[In the formula, $R^{11}$ represents a hydrocarbon group having 11 to 30 carbon atoms which may have a substituent. $R^{0a}$ represents a hydrocarbon group having 12 to 31 carbon atoms which may have a substituent or a hydrogen atom. $R^{0b}$ represents an n-valent hydrocarbon group having 4 to 12 carbon atoms which may have a substituent. $R^{21}$ represents an alkylene group having 2 to 6 carbon atoms. $R^{0c}$ represents an alkylene group having 2 to 6 carbon atoms or a single bond. n is 1 or 2; When n is 1, m is an integer of 1 to 3. When n is 2, m is 1.]

$R^{Ob}$ is an n-valent hydrocarbon group having 4 to 12 carbon atoms, and this n-valent hydrocarbon group may have a substituent.

In General Formula (1), in a case where n is 2, all of a plurality of $R^{11}$, a plurality of $R^{21}$, a plurality of $R^{Oa}$, and a plurality of $R^{Oc}$ may be different or the same.

The compound represented by General Formula (1) may be a compound represented by General Formula (2) or General Formula (3).

[Compound Represented by General Formula (2)]

In the compound represented by General Formula (2), in General Formula (1), n is 1, $R^{Oa}$ is —NH—C(=O)—$R^{12}$, $R^{Ob}$ is $R^{Ob1}$, and $R^{Oc}$ is $R^{22}$.

$$R^{11}-\overset{O}{\overset{\|}{C}}-\overset{H}{\overset{|}{N}}-R^{21}-(\overset{H}{\overset{|}{N}}-R^{22})_{m}-\overset{H}{\overset{|}{N}}-\overset{O}{\overset{\|}{C}}-R^{12} \qquad (2)$$

with $R^{Ob1}$ attached via $C=O$ to the central N.

[In the formula, $R^{11}$ and $R^{12}$ each independently represent a hydrocarbon group having 11 to 30 carbon atoms which may have a substituent. $R^{Ob1}$ represents a hydrocarbon group having 4 to 12 carbon atoms which may have a substituent. $R^{21}$ and $R^{22}$ each independently represent an alkylene group having 2 to 6 carbon atoms. m represents an integer in a range of 1 to 3.]

In General Formula (2), $R^{11}$, $R^{12}$, and $R^{Ob1}$ may each be a saturated hydrocarbon group or an unsaturated hydrocarbon group. Each of $R^{11}$, $R^{12}$, and $R^{Ob1}$ is preferably a saturated hydrocarbon group.

$R^{11}$ and $R^{12}$ are each preferably a hydrocarbon group having 14 to 25 carbon atoms which may have a substituent, and more preferably a hydrocarbon group having 14 to 20 carbon atoms which may have a substituent.

In a case where $R^{11}$ or $R^{12}$ has a substituent, as the substituent, —$CONH_2$, amino group (—$NH_2$), carboxyl group, and the like are exemplary examples.

$R^{Ob1}$ is preferably a hydrocarbon group having 5 to 10 carbon atoms which may have a substituent, and more preferably a hydrocarbon group having 6 to 9 carbon atoms which may have a substituent.

In a case where $R^{Ob1}$ has a substituent, as the substituent, —$CONH_2$, amino group (—$NH_2$), carboxyl group, and the like are exemplary examples. The substituent that $R^{Ob1}$ may have is preferably —$CONH_2$.

Each of $R^{21}$ and $R^{22}$ is preferably an alkylene group having 2 carbon atoms.

m is preferably 1.

For the compound represented by General Formula (2), one type may be used alone, or two or more types may be mixed together and used.

The compound represented by General Formula (2) is preferably N,N-bis(2-stearamidoethyl)-azelicamide or N,N-bis(2-stearamidoethyl)-sebacamide.

In N,N-bis(2-stearamidoethyl)-azelicamide, in General Formula (2), $R^{11}$ and $R^{12}$ are each a linear alkyl group having 17 carbon atoms, $R^{Ob1}$ is —$(CH_2)_7$—$CONH_2$, $R^{21}$ and $R^{22}$ are alkylene groups having 2 carbon atoms, and m is 1.

In N,N-bis(2-stearamidoethyl)-sebacamide, in General Formula (2), $R^{11}$ and $R^{12}$ are each a linear alkyl group having 17 carbon atoms, $R^{Ob1}$ is —$(CH_2)_8$—$CONH_2$, $R^{21}$ and $R^{22}$ are alkylene groups having 2 carbon atoms, and m is 1.

[Compound Represented by General Formula (3)]

In the compound represented by General Formula (3), in General Formula (1), n is 2, m is 1, and $R^{Ob}$ is $R^{Ob2}$ $$\begin{array}{c} R^{11'}-\overset{O}{\overset{\|}{C}}-\overset{H}{\overset{|}{N}}-R^{21'}-N-R^{Oc'}-R^{Oa'} \\ \qquad\qquad\qquad | \\ \qquad\qquad\qquad O=C \\ \qquad\qquad\qquad | \\ \qquad\qquad\qquad R^{Ob2} \\ \qquad\qquad\qquad | \\ \qquad\qquad\qquad C=O \\ \qquad\qquad\qquad | \\ R^{11}-\overset{O}{\overset{\|}{C}}-\overset{H}{\overset{|}{N}}-R^{21}-N-R^{Oc}-R^{Oa} \end{array} \qquad (3)$$

[In the formula, $R^{11}$ and $R^{11'}$ each independently represent a hydrocarbon group having 11 to 30 carbon atoms which may have a substituent. $R^{Oa}$ and $R^{Oa'}$ each independently represent a hydrocarbon group having 12 to 31 carbon atoms which may have a substituent or a hydrogen atom. $R^{Ob2}$ represents a hydrocarbon group having 4 to 12 carbon atoms which may have a substituent. $R^{21}$ and $R^{21'}$ each independently represent an alkylene group having 2 to 6 carbon atoms. $R^{Oc}$ and $R^{Oc'}$ each independently represent an alkylene group having 2 to 6 carbon atoms or a single bond.]

In General Formula (3), $R^{11}$ and $R^{11'}$ may be each a saturated hydrocarbon group or an unsaturated hydrocarbon group. Each of $R^{11}$ and $R^{11'}$ is preferably a saturated hydrocarbon group.

Each of $R^{11}$ and $R^{11'}$ is preferably a hydrocarbon group having 14 to 25 carbon atoms which may have a substituent, and more preferably a hydrocarbon group having 14 to 20 carbon atoms which may have a substituent.

In a case where $R^{11}$ and $R^{11'}$ have a substituent, as the substituent, —$CONH_2$, amino group (—$NH_2$), carboxyl group, and the like are exemplary examples.

$R^{Ob2}$ may be a saturated hydrocarbon group or an unsaturated hydrocarbon group. $R^{Ob2}$ is preferably a saturated hydrocarbon group.

$R^{Ob2}$ is preferably a hydrocarbon group having 5 to 10 carbon atoms which may have a substituent, and more preferably a hydrocarbon group having 6 to 9 carbon atoms which may have a substituent.

In a case where $R^{Ob2}$ has a substituent, as the substituent, —$CONH_2$, amino group (—$NH_2$), carboxyl group, and the like are exemplary examples.

Each of $R^{21}$ and $R^{21'}$ is preferably an alkylene group having 2 carbon atoms.

Each of $R^{Oa}$ and $R^{Oa'}$ may be a saturated hydrocarbon group, and may be an unsaturated hydrocarbon group, or may be a hydrogen atom.

Each of $R^{Oa}$ and $R^{Oa'}$ is preferably a saturated hydrocarbon group or a hydrogen atom, and more preferably a hydrogen atom.

Each of $R^{Oc}$ and $R^{Oc'}$ is preferably a single bond.

$R^{Oc}$-$R^{Oa}$ and $R^{Oc'}$-$R^{Oa'}$ are preferably single bond-hydrogen atoms.

The compound represented by General Formula (3) is preferably N,N'-bis(2-stearamidoethyl)-azelicamide or N,N'-bis(2-stearamidoethyl)-sebacamide.

In N,N'-bis(2-stearamidoethyl)-azelicamide, in General Formula (3), $R^{11}$ and $R^{11'}$ are linear alkyl groups having 17 carbon atoms, $R^{Oa}$ and $R^{Oa'}$ are hydrogen atoms, $R^{Ob2}$ is —$(CH_2)_7$—, $R^{Oc}$ and $R^{Oc'}$ are single bonds, and $R^{21}$ and $R^{21'}$ are alkylene groups having 2 carbon atoms.

In N,N'-bis(2-stearamidoethyl)-sebacamide, in General Formula (3), $R^{11}$ and $R^{11'}$ are linear alkyl groups having 17 carbon atoms, and $R^{0a}$ and $R^{0a'}$ are hydrogen atoms, $R^{0b2}$ is —$(CH_2)_8$—, $R^{0c}$ and $R^{0c'}$ are single bonds, and $R^{21}$ and $R^{21'}$ are alkylene groups having 2 carbon atoms.

For the compound represented by General Formula (1), one type may be used alone, or two or more types may be mixed together and used.

The compound represented by General Formula (1) is preferably a compound represented by General Formula (2) or General Formula (3), and more preferably a compound represented by General Formula (3).

The amount of the compound represented by General Formula (1) in the flux is preferably 1% by mass or more and 10% by mass or less with respect to the total amount (100% by mass) of the flux.

<<Polyamide (PA1)>>

A specific polyamide (PA1) is used in the flux of the present embodiment. The specific polyamide (PA1) is a condensate of one or more selected from the group consisting of an aliphatic carboxylic acid and a hydroxy group-containing aliphatic carboxylic acid, and an amine.

The specific polyamide (PA1) includes a "condensate of aliphatic carboxylic acids and amines", a "condensate of hydroxy group-containing aliphatic carboxylic acids and amines", and a "condensate of hydroxy group-containing aliphatic carboxylic acids, aliphatic carboxylic acids, and amines".

The endothermic peak temperature of the specific polyamide (PA1) by differential scanning calorimetry is 120° C. or higher and 200° C. or lower.

For the aliphatic carboxylic acid from which the specific polyamide (PA1) is derived, one type may be used alone or two or more types may be mixed together and used.

As the aliphatic carboxylic acid, monocarboxylic acid, dicarboxylic acid, tricarboxylic acid, and the like are exemplary examples. The aliphatic carboxylic acid is preferably monocarboxylic acid or dicarboxylic acid, and more preferably dicarboxylic acid.

The hydrocarbon group of the aliphatic carboxylic acid may be linear, branched, or cyclic. The hydrocarbon group is preferably linear or branched, and more preferably linear.

The hydrocarbon group may be a saturated hydrocarbon group or an unsaturated hydrocarbon group. The hydrocarbon group is preferably a saturated hydrocarbon group.

The number of carbon atoms in the aliphatic monocarboxylic acid is preferably 12 to 22, more preferably 14 to 22, and further more preferably 16 to 22.

As the aliphatic monocarboxylic acid, lauric acid, myristic acid, pentadecyl acid, palmitic acid, margaric acid, stearic acid, nonadecanoic acid, arachidic acid, behenic acid, and the like are exemplary examples. The aliphatic monocarboxylic acid is preferably palmitic acid or stearic acid.

The number of carbon atoms in the aliphatic dicarboxylic acid is preferably 2 to 20, more preferably 6 to 16, and further more preferably 8 to 14.

As the aliphatic dicarboxylic acid, adipic acid, pimelic acid, suberic acid, azelaic acid, sebacic acid, undecanedioic acid, dodecanedioic acid, tridecanedioic acid, tetradecanedioic acid, pentadecanedioic acid, and the like are exemplary examples. The aliphatic dicarboxylic acid is preferably suberic acid, azelaic acid, sebacic acid, undecanedioic acid, or dodecanedioic acid, and more preferably sebacic acid or dodecanedioic acid.

The aliphatic carboxylic acid may include one or more selected from the group consisting of sebacic acid and dodecanedioic acid, and one or more selected from the group consisting of palmitic acid and stearic acid.

For the hydroxy group-containing aliphatic carboxylic acid from which the specific polyamide (PA1) is derived, one type may be used alone or two or more types may be mixed together and used.

The hydrocarbon group of the hydroxy group-containing aliphatic carboxylic acid may be linear, branched, or cyclic. The hydrocarbon group is preferably linear or branched, and more preferably linear.

The hydrocarbon group may be a saturated hydrocarbon group or an unsaturated hydrocarbon group. The hydrocarbon group is preferably a saturated hydrocarbon group.

The number of carbon atoms in the hydroxy group-containing aliphatic carboxylic acid is preferably 10 to 25, and more preferably 15 to 21.

As the hydroxy group-containing aliphatic carboxylic acid, hydroxypentadecanoic acid, hydroxyhexadecanoic acid, hydroxyheptadecanoic acid, hydroxyoctadecanoic acid (hydroxystearic acid), hydroxyeicosanoic acid, hydroxyheneicosanoic acid, and the like are exemplary examples. The hydroxy group-containing aliphatic carboxylic acid is preferably hydroxystearic acid, and more preferably 12-hydroxystearic acid.

For the amines from which the specific polyamide (PA1) is derived, one type may be used, or two or more types may be mixed together and used.

As the amine, aliphatic amine and aromatic amine are exemplary examples. The amine is preferably an aliphatic amine.

As the amine, monoamine, diamine, triamine, and tetraamine are exemplary examples. The amine is preferably a diamine.

The hydrocarbon group of the aliphatic amine may be linear, branched, or cyclic. The hydrocarbon group is preferably linear or branched, and more preferably linear. The number of carbon atoms in the aliphatic amine is preferably 3 to 10, and more preferably 4 to 8.

The hydrocarbon group may be a saturated hydrocarbon group or an unsaturated hydrocarbon group. The hydrocarbon group is preferably a saturated hydrocarbon group.

As the amine, ethylenediamine, 1,3-propanediamine, 1,4-butanediamine, hexamethylenediamine, methaxylenediamine, tolylenediamine, paraxylenediamine, phenylenediamine, isophoronediamine, 1,10-decanediamine, 1,12-dodecanediamine, 4,4-diaminodicyclohexylmethane, 4,4-diaminodiphenylmethane, butane-1,1,4,4-tetraamine, pyrimidine-2,4,5,6-tetraamine, and the like are exemplary examples. The amine is preferably hexamethylenediamine.

An endothermic peak temperature of polyamide is measured by DSC (Differential Scanning Calorimetry).

As a specific method of measuring an endothermic peak, there is a method of measurement by setting a temperature raising rate to 20° C./min and raising a temperature of about 10 mg of polyamide from 25° C. to 350° C. in a nitrogen atmosphere. As a measuring apparatus, DSC7020 (manufactured by Hitachi High-Tech Science) can be used. In the present specification, the endothermic peak temperature means a peak top temperature.

The specific polyamide (PA1) used in the flux of the present embodiment has one or two or more endothermic peaks in a temperature range of 120° C. or higher and 200° C. or lower.

In a case where the number of endothermic peaks is one, the temperature of the endothermic peak is preferably 150° C. or higher and 200° C. or lower, more preferably 160° C. or higher and 200° C. or lower, further more preferably 170° C. or higher and 200° C. or lower, and particularly preferably 180° C. or higher and 200° C. or lower.

In a case where the number of endothermic peaks is 2 or more, for example, the lowest temperature of the endothermic peaks of the polyamide (PA1) may be in a range of 120° C. or higher and 200° C. or lower, the highest temperature of the endothermic peaks may be in a range of 120° C. or higher and 200° C. or lower, or all the endothermic peaks may be in a range of 120° C. or higher and 200° C. or lower.

The highest temperature of the endothermic peaks is preferably 150° C. or higher and 200° C. or lower, more preferably 160° C. or higher and 200° C. or lower, further more preferably 170° C. or higher and 200° C. or lower, and particularly preferably 180° C. or higher and 200° C. or lower.

In measurement by DSC of polyamide (PA1), the ratio of the endothermic amount in the range of 160° C. or higher and 200° C. or lower is preferably 30% or more, more preferably 40% or more, and further more preferably 45% or more with respect to a total endothermic amount in the range of 50° C. or higher and 200° C. or lower.

An upper limit of the ratio of the endothermic amount is not particularly limited as long as the effect of the invention is exhibited, and may be 80% or less, 70% or less, or 60% or less.

The ratio of the endothermic amount is preferably 30% or more and 80% or less, more preferably 40% or more and 80% or less, and further more preferably 45% or more and 80% or less. Alternatively, the ratio of the endothermic amount is preferably 30% or more and 70% or less, more preferably 40% or more and 70% or less, and further more preferably 45% or more and 70% or less.

In measurement by DSC of polyamide (PA1), the ratio of the endothermic amount in the range of 160° C. or higher and 200° C. or lower is the lower limit value or more, and thus it is possible to sufficiently suppress heating sagging during reflow. In particular, even in a case where a preheating temperature is raised, for example, even in a case where the preheating temperature is 190° C. or higher, or even 200° C. or higher, it is possible to suppress heating sagging.

In the present specification, the endothermic amount of the polyamide can be calculated from a peak area of the DSC curve of the polyamide.

In measurement by DSC of the polyamide (PA1), the ratio of the endothermic amount in the range of 50° C. or higher and 150° C. or lower is preferably 80% or less, more preferably 60% or less, and further more preferably 50% or less with respect to the total endothermic amount in the range of 50° C. or higher and 200° C. or lower.

A lower limit of the ratio of the endothermic amount is not particularly limited as long as the effect of the invention is exhibited, and may be, for example, 10% or more, 20% or more, or 30% or more.

The ratio of the endothermic amount is preferably 10% or more and 80% or less, more preferably 10% or more and 60% or less, and further more preferably 10% or more and 50% or less. Alternatively, the ratio of the endothermic amount is preferably 20% or more and 80% or less, more preferably 20% or more and 60% or less, and further more preferably 20% or more and 50% or less.

In measurement by DSC of the polyamide (PA1), the ratio of the endothermic amount in a range of 50° C. or higher and 180° C. or lower is preferably 95% or less, more preferably 90% or less, and further more preferably 85% or less with respect to the total endothermic amount in the range of 50° C. or higher and 200° C. or lower.

A lower limit of the ratio of the endothermic amount is not particularly limited as long as the effect of the invention is exhibited, and, for example, may be 40% or more, 50% or more, or 60% or more.

The ratio of the endothermic amount is preferably 40% or more and 95% or less, more preferably 40% or more and 90% or less, and further more preferably 40% or more and 85% or less. Alternatively, the ratio of the endothermic amount is preferably 50% or more and 95% or less, more preferably 50% or more and 90% or less, and further more preferably 50% or more and 85% or less.

A specific polyamide (PA1) contained in a flux of the present embodiment is preferably a condensate of an aliphatic carboxylic acid, a hydroxy group-containing monocarboxylic acid, and an amine, from a viewpoint of further enhancing the ability to suppress heating sagging.

The specific polyamide (PA1) contained in the flux of the present embodiment is more preferably a condensate of dicarboxylic acid, hydroxy group-containing monocarboxylic acid, and diamine. The specific polyamide (PA1) contained in the flux of the present embodiment is further more preferably a condensate of an aliphatic dicarboxylic acid having 8 to 14 carbon atoms, a hydroxy group-containing aliphatic monocarboxylic acid having 15 to 21 carbon atoms, and an aliphatic diamine having 4 to 8 carbon atoms.

Among these, the polyamide (PA1) is particularly preferably a condensate of a 12-hydroxystearic acid, a hexamethylenediamine, and one or more selected from the group consisting of sebacic acid and dodecanedioic acid.

The polyamide (PA1) may be a condensate of a 12-hydroxystearic acid, a hexamethylenediamine, one or more selected from the group consisting of sebacic acid and dodecanedioic acid, and one or more selected from the group consisting of palmitic acid and stearic acid.

In a case where the polyamide (PA1) is a condensate of an aliphatic dicarboxylic acid, a hydroxy group-containing aliphatic monocarboxylic acid, and an aliphatic diamine, the molar ratio of these raw materials preferably satisfies the following relational expression.

Here, the aliphatic dicarboxylic acid, the hydroxy group-containing aliphatic monocarboxylic acid, and the aliphatic diamine, which are used as raw materials of the polyamide (PA1), are denoted as X mole, Y mole, and Z mole, respectively.

A total number of moles of amino groups in the compound contained in the raw materials is equal to the total number of moles of carboxyl groups, or the total number of moles of amino groups in the compound contained in the raw materials is preferably less than the total number of moles of carboxyl groups. Specifically, it is preferable to satisfy $2Z \leq 2X+Y$.

The molar ratio relationship between the raw materials is preferably $0.2Y \leq X \leq 2Y$, and more preferably $0.4Y \leq X \leq 1.5Y$. The molar ratio relationship between the raw materials is preferably $0.5Y \leq Z \leq 2Y$, and more preferably $0.8Y \leq Z \leq 1.8Y$.

The amount of the polyamide (PA1) in the flux is preferably 1% by mass or more and 15% by mass or less, more preferably 2% by mass or more and 10% by mass or less, and further more preferably 3% by mass or more and 6% by mass or less with respect to the total amount (100% by mass) of the flux.

The ratio of the compound represented by General Formula (1) to the total mass (100% by mass) of the compound represented by General Formula (1) and the specific polyamide (PA1) is preferably 10% by mass or more and 90% by mass or less, and more preferably 15% by mass or more and 75% by mass or less.

<<Other Thixotropic Agents>>

A thixotropic agent may include other thixotropic agents in addition to the compound represented by General Formula (1) and the polyamide (PA1).

As the other thixotropic agents, an amide-based thixotropic agent other than the above-mentioned ones, a wax-based thixotropic agent, and a sorbitol-based thixotropic agent are exemplary examples.

For the other thixotropic agents, one type may be used alone, or two or more types may be mixed together and used.

As the amide-based thixotropic agent other than the above-mentioned ones, a monoamide, a bisamide, and other polyamides are exemplary examples.

As the monoamide, lauric acid amide, palmitic acid amide, stearic acid amide, behenic acid amide, hydroxystearic acid amide, saturated fatty acid amide, oleic acid amide, erucic acid amide, unsaturated fatty acid amide, p-toluamide, p-toluenemethane amide, aromatic amide, hexamethylene hydroxystearic acid amide, substituted amide, methylol stearic acid amide, methylol amide, fatty acid ester amide, and the like are exemplary examples.

As the bisamide, methylene bisstearic acid amide, ethylene bislauric acid amide, ethylene bishydroxy fatty acid (the number of carbon atoms in the fatty acid: C6 to 24) amide, ethylene bisstearic acid amide, ethylene bishydroxystearic acid amide, saturated fatty acid bisamide, methylene bisoleic acid amide, unsaturated fatty acid bisamide, m-xylylene bisstearic acid amide, aromatic bisamide, and the like are exemplary examples.

As the other polyamides, saturated fatty acid polyamide, unsaturated fatty acid polyamide, aromatic polyamide, tris 1,2,3-propanetricarboxylate (2-methylcyclohexylamide), cyclic amide oligomer, acyclic amide oligomer, and the like are exemplary examples.

As the cyclic amide oligomer, an amide oligomer in which a dicarboxylic acid and a diamine are cyclically polycondensed, an amide oligomer in which a tricarboxylic acid and a diamine are cyclically polycondensed, an amide oligomer in which a dicarboxylic acid and a triamine are cyclically polycondensed, an amide oligomer in which a tricarboxylic acid and a triamine are cyclically polycondensed, an amide oligomer in which a dicarboxylic acid, a tricarboxylic acid, and a diamine are cyclically polycondensed, an amide oligomer in which a dicarboxylic acid, a tricarboxylic acid, and a triamine are cyclically polycondensed, an amide oligomer in which a dicarboxylic acid, a diamine, and a triamine are cyclically polycondensed, an amide oligomer in which a tricarboxylic acid, a diamine, and a triamine are cyclically polycondensed, an amide oligomer in which a dicarboxylic acid, a tricarboxylic acid, a diamine, and a triamine are cyclically polycondensed, and the like are exemplary examples.

In addition, as the acyclic amide oligomer, a case of an amide oligomer in which a monocarboxylic acid, a diamine, and/or a triamine are acyclically polycondensed, a case of an amide oligomer in which a dicarboxylic acid and/or a tricarboxylic acid, and a monoamine are acyclically polycondensed, and the like are exemplary examples. In the case of an amide oligomer containing a monocarboxylic acid or a monoamine, the monocarboxylic acid and the monoamine function as terminal molecules, thereby resulting in an acyclic amide oligomer having a reduced molecular weight. In addition, in a case where the acyclic amide oligomer is an amide compound in which a dicarboxylic acid and/or a tricarboxylic acid, and a diamine and/or a triamine are acyclically polycondensed, the acyclic amide oligomer is an acyclic polymer-based amide polymer. In addition, the acyclic amide oligomer also includes an amide oligomer in which a monocarboxylic acid and a monoamine are acyclically condensed.

The total amount of the amide-based thixotropic agent in the flux is preferably 3% by mass or more and 30% by mass or less, more preferably 4% by mass or more and 20% by mass or less, and further more preferably 5.5% by mass or more and 14.5% by mass or less with respect to the total amount (100% by mass) of the flux.

As the wax-based thixotropic agent, an ester compound is an exemplary example, and hardened castor oil is a specific exemplary example.

The amount of the wax-based thixotropic agent in the flux is preferably 0% by mass or more and 10% by mass or less, more preferably 0% by mass or more and 5% by mass or less, and further more preferably 0% by mass or more and 3% by mass or less with respect to the total amount (100% by mass) of the flux.

As the sorbitol-based thixotropic agent, dibenzylidene-D-sorbitol, bis(4-methylbenzylidene)-D-sorbitol, (D-)sorbitol, monobenzylidene (-D-)sorbitol, mono(4-methylbenzylidene)-(D-)sorbitol, and the like are exemplary examples.

The amount of the sorbitol-based thixotropic agent in the flux is preferably 0% by mass or more and 5.0% by mass or less, and more preferably 0% by mass or more and 3.5% by mass or less with respect to the total amount (100% by mass) of the flux.

The total amount of the thixotropic agent in the flux is preferably 2% by mass or more and 30% by mass or less, more preferably 4% by mass or more and 20% by mass or less, and further more preferably 5% by mass or more and 15% by mass or less with respect to the total amount (100% by mass) of the flux.

The amount of other thixotropic agents in the flux is preferably 0% by mass or more and 10% by mass or less, and more preferably 0% by mass or more and 5% by mass or less with respect to the total amount (100% by mass) of the flux.

The ratio of the other thixotropic agents in the flux is preferably 0% by mass or more and 50% by mass or less, more preferably 0% by mass or more and 30% by mass or less, and further more preferably 0% by mass or more and 20% by mass or less with respect to the total mass (100% by mass) of the thixotropic agents.

<Activator>

As the activator, an organic acid, a halogen-based activator, an amine, and the like are exemplary examples.

Organic Acid:

As the organic acid, glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, dithioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, propionic acid, malic acid, p-anisic acid, stearic acid, 12-hydroxystearic acid, oleic acid, linoleic acid, linolenic acid, palmitic acid, pimelic acid, dimer acid, trimer acid, hydrogenated dimer acid, which is a hydrogenated product obtained by adding hydrogen to dimer acid, hydrogenated trimer acid, which is a hydrogenated product obtained by adding hydrogen to trimer acid, and the like are exemplary examples.

For the organic acid, one type may be used alone, or two or more types may be mixed together and used.

The organic acid is preferably a dicarboxylic acid.

The dicarboxylic acid is preferably one or more selected from the group consisting of glutaric acid, adipic acid, pimelic acid, suberic acid, azelaic acid, and sebacic acid, and more preferably one or more selected from the group consisting of glutaric acid, adipic acid, and azelaic acid.

The total amount of the organic acid in the flux is preferably 3% by mass or more and 10% by mass or less, and more preferably 5% by mass or more and 8% by mass or less with respect to the total amount (100% by mass) of the flux.

Halogen-Based Activator:

As the halogen-based activator, halogenated aliphatic compound, amine hydrohalic acid salt, and the like are exemplary examples.

For the halogen-based activator, one type may be used alone, or two or more types may be mixed together and used.

As the halogenated aliphatic compound, 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, 2,3-dibromo-1,4-butanediol, trans-2,3-dibromo-2-butene-1,4-diol, and the like are exemplary examples.

The amine hydrohalic acid salt is a compound obtained by reacting amines with hydrogen halides, as the amine, ethylamine, diethylamine, triethylamine, ethylenediamine, 1,3-diphenylguanidine, 1,3-di-o-tolylguanidine, 1-o-tolylbiguanide, and the like are exemplary examples, and as the hydrogen halide, hydrides of chlorine, bromine, and iodine, and the like are exemplary examples.

The flux of the present embodiment preferably contains a halogen-based activator.

The flux of the present embodiment preferably contains a halogenated aliphatic compound.

The halogenated aliphatic compound is preferably trans-2,3-dibromo-2-butene-1,4-diol.

The total amount of the halogen-based activator in the flux is preferably 0% by mass or more and 5% by mass or less with respect to the total amount (100% by mass) of the flux.

Amine:

As the amine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole, and the like are exemplary examples.

For the amine, one type may be used alone, or two or more types may be mixed together and used.

The amine is preferably one or more selected from the group consisting of 2-phenylimidazole and 2-phenyl-4-methylimidazole.

The amount of the amine in the flux is preferably more than 0% by mass and 20% by mass or less, more preferably more than 0% by mass and 10% by mass or less, further more preferably more than 0% by mass and 3% by mass or less, and particularly preferably more than 0% by mass and 1% by mass or less with respect to the total amount (100% by mass) of the flux.

<Other Components>

In addition, the flux of the present embodiment may further include other components in addition to rosin, a solvent, a thixotropic agent, and an activator.

As the other components, a surfactant, a silane coupling agent, a colorant, and the like are exemplary examples.

As the surfactant, a nonionic surfactant, a weak cationic surfactant, and the like are exemplary examples.

As the nonionic surfactant, polyethylene glycol, a polyethylene glycol-polypropylene glycol copolymer, an aliphatic alcohol polyoxyethylene adduct, an aromatic alcohol polyoxyethylene adduct, a polyhydric alcohol polyoxyethylene adduct, and the like are exemplary examples.

As the weak cationic surfactant, diamine-terminated polyethylene glycol, a diamine-terminated polyethylene glycol-polypropylene glycol copolymer, an aliphatic amine polyoxyethylene adduct, an aromatic amine polyoxyethylene adduct, a polyvalent amine polyoxyethylene adduct, and the like are exemplary examples.

As the surfactant other than the above examples, polyoxyalkylene acetylene glycols, polyoxyalkylene glyceryl ethers, polyoxyalkylene alkyl ethers, polyoxyalkylene esters, polyoxyalkylene alkylamines, polyoxyalkylene alkylamides, and the like are exemplary examples.

In addition, an antioxidant may be used for the purpose of suppressing oxidation of solder alloy powder in the flux of the present embodiment. As the antioxidant, a hindered phenol-based antioxidant such as 2,2'-methylenebis[6-(1-methylcyclohexyl)-p-cresol] may be used.

An additive such as a matting agent and an anti-foaming agent may be further added to the flux of the present embodiment.

The flux of the present embodiment described above uses a combination of the specific amide compound represented by General Formula (1) and the specific polyamide as the thixotropic agent, and thus it is possible to sufficiently suppress heating sagging during reflow. In particular, in a case where a preheating temperature is raised, for example, even in a case where the preheating temperature is 190° C. or higher, or even 200° C. or higher, it is possible to suppress heating sagging by applying this combination.

(Solder paste) A solder paste of the present embodiment contains solder alloy powder and the above-mentioned flux.

The solder alloy powder may be constituted of solder powders of Sn single body, or solder alloy powder obtained by adding Sb, Bi, In, Cu, Zn, As, Ag, Cd, Fe, Ni, Co, Au, Ge, P, and the like to Sn—Ag-based, Sn—Cu-based, Sn—Ag—Cu-based, Sn—Bi-based, and Sn—In-based powders, or alloys of these.

The solder alloy powders may be constituted of solder alloy powders obtained by adding Sb, Bi, In, Cu, Zn, As, Ag, Cd, Fe, Ni, Co, Au, Ge, and P to the Sn—Pb-based powders, or Sn—Pb-based powders.

The solder alloy powder is preferably Pb-free solders.

Amount of Flux:

The amount of the flux in a solder paste is preferably 5% to 30% by mass, and more preferably 5% to 15% by mass with respect to the total mass of the solder paste.

Since the solder paste of the present embodiment contains the above-described flux, it is possible to sufficiently suppress heating sagging.

In addition, the flux of the present embodiment may have other embodiments than those described above. In such other embodiments, the flux contains rosin, a solvent, a specific thixotropic agent, and an activator.

<Rosin>

As rosin used in the flux of such other embodiments, those described above are exemplary examples.

For the rosin, one type may be used alone, or two or more types may be mixed together and used.

The amount of the rosin in the flux of other embodiments is preferably 30% by mass or more and 50% by mass or less, and more preferably 30% by mass or more and 40% by mass or less with respect to the total amount (100% by mass) of the flux.

<Solvent>

As the solvents used in the flux of such other embodiments, those described above are exemplary examples.

For the solvent, one type may be used alone, or two or more types may be mixed together and used.

The amount of the solvent in the flux of such other embodiments is preferably 30% by mass or more and 60% by mass or less, and more preferably 35% by mass or more and 55% by mass or less with respect to the total amount (100% by mass) of the flux.

<Specific Thixotropic Agent>

The flux of such other embodiments includes a polyamide (PA2) as a specific thixotropic agent.

The polyamide (PA2) is a condensate of an aliphatic amine having 3 to 10 carbon atoms and one or more selected from the group consisting of aliphatic carboxylic acid and hydroxy group-containing aliphatic carboxylic acid.

That is, the polyamide (PA2) is obtained by specifying amine which is a raw material of the polyamide (PA1) as an aliphatic amine having 3 to 10 carbon atoms.

For the aliphatic carboxylic acid from which the polyamide (PA2) is derived, one type may be used alone, or two or more types may be mixed together and used.

As the aliphatic carboxylic acid, monocarboxylic acid, dicarboxylic acid, tricarboxylic acid, and the like are exemplary examples. The aliphatic carboxylic acid is preferably monocarboxylic acid or dicarboxylic acid, and more preferably dicarboxylic acid.

The hydrocarbon group of the aliphatic carboxylic acid may be linear, branched, or cyclic. The hydrocarbon group is preferably linear or branched, and more preferably linear.

The hydrocarbon group may be a saturated hydrocarbon group or an unsaturated hydrocarbon group. The hydrocarbon group is preferably a saturated hydrocarbon group.

The number of carbon atoms in the aliphatic monocarboxylic acid is preferably 12 to 22, more preferably 14 to 22, and further more preferably 16 to 22.

As the aliphatic monocarboxylic acid, lauric acid, myristic acid, pentadecyl acid, palmitic acid, margaric acid, stearic acid, nonadecanoic acid, arachidic acid, behenic acid, and the like are exemplary examples. The aliphatic monocarboxylic acid is preferably a palmitic acid or stearic acid.

The number of carbon atoms in the aliphatic dicarboxylic acid is preferably 11 to 20, more preferably 12 to 18, and further more preferably 12 to 16.

As the aliphatic dicarboxylic acid, dodecanedioic acid, tridecanedioic acid, tetradecanedioic acid, pentadecanedioic acid, and the like are exemplary examples. The aliphatic dicarboxylic acid is preferably dodecanedioic acid.

The aliphatic carboxylic acid may include dodecanedioic acid and one or more selected from the group consisting of palmitic acid and stearic acid.

For the hydroxy group-containing aliphatic carboxylic acid from which the polyamide (PA2) is derived, one type may be used alone or two or more types may be mixed together and used.

The hydrocarbon group of the hydroxy group-containing aliphatic carboxylic acid may be linear, branched, or cyclic. The hydrocarbon group is preferably linear or branched, and more preferably linear.

The hydrocarbon group may be a saturated hydrocarbon group or an unsaturated hydrocarbon group. The hydrocarbon group is preferably a saturated hydrocarbon group.

The number of carbon atoms in the hydroxy group-containing aliphatic carboxylic acid is preferably 10 to 25, and more preferably 15 to 21.

As the hydroxy group-containing aliphatic carboxylic acid, hydroxypentadecanoic acid, hydroxyhexadecanoic acid, hydroxyheptadecanoic acid, hydroxyoctadecanoic acid (hydroxystearic acid), hydroxyeicosanoic acid, hydroxyheneicosanoic acid, and the like are exemplary examples. The hydroxy group-containing aliphatic carboxylic acid is preferably hydroxystearic acid, and more preferably 12-hydroxystearic acid.

The amine from which polyamide (PA2) is derived is an aliphatic amine having 3 to 10 carbon atoms. For the amine from which the polyamide (PA2) is derived, one type may be used alone, or two or more types may be mixed together and used.

As the aliphatic amine, monoamine, diamine, triamine, tetraamine, and the like are exemplary examples. The amine is preferably a diamine.

The hydrocarbon group of the aliphatic amine may be linear, branched, or cyclic. The hydrocarbon group is preferably linear or branched, and more preferably linear. The number of carbon atoms in the aliphatic amine is preferably 4 to 8.

The hydrocarbon group may be a saturated hydrocarbon group or an unsaturated hydrocarbon group. The hydrocarbon group is preferably a saturated hydrocarbon group.

As the aliphatic amine, 1,3-propanediamine, 1,4-butanediamine, hexamethylenediamine, butane-1,1,4,4-tetraamine, and the like are exemplary examples. The aliphatic amine is preferably hexamethylenediamine.

The polyamide (PA2) is preferably a condensate of an aliphatic carboxylic acid, a hydroxy group-containing monocarboxylic acid, and an aliphatic diamine having 3 to 10 carbon atoms.

The polyamide (PA2) is more preferably a condensate of an aliphatic dicarboxylic acid having 12 to 20 carbon atoms, a hydroxy group-containing monocarboxylic acid having 15 to 21 carbon atoms, and an aliphatic diamine having 4 to 8 carbon atoms.

Among these, the polyamide (PA2) is further more preferably a condensate of dodecanedioic acid, 12-hydroxystearic acid, and hexamethylenediamine.

The polyamide (PA2) may be a condensate of 12-hydroxystearic acid, hexamethylenediamine, and one or more selected from the group consisting of dodecanedioic acid, palmitic acid, and stearic acid.

The polyamide (PA2) has the following properties.

In measurement by DSC of the polyamide (PA2), an endothermic amount in a range of 50° C. or higher and 190° C. or lower is preferably 90% or more, more preferably 92% or more, and further more preferably 94% or more with respect to the total endothermic amount in a range of 50° C. or higher and 200° C. or lower.

The ratio of the endothermic amount is preferably as high as possible. An upper limit of the ratio of the endothermic amount is not particularly limited as long as the effect of the invention is exhibited, and may be, for example, 100%.

The ratio of the endothermic amount is preferably 90% or more and 100% or less, more preferably 92% or more and 100% or less, and further more preferably 94% or more and 100% or less.

As the ratio of the endothermic amount is equal to or higher than the lower limit, the ability to suppress void generation is likely to be enhanced.

In measurement by DSC of the polyamide (PA2), the endothermic amount in a range of 50° C. or higher and 195° C. or lower is preferably 96% or more, more preferably 98% or more, and further more preferably 99% or more with respect to the total endothermic amount in a range of 50° C. or higher and 200° C. or lower.

The ratio of the endothermic amount is preferably as high as possible. The upper limit of the ratio of the endothermic amount is not particularly limited as long as the effect of the invention is exhibited, and may be, for example, 100%.

The ratio of the endothermic amount is preferably 96% or more and 100% or less, more preferably 98% or more and 100% or less, and further more preferably 99% or more and 100% or less.

As the ratio of the endothermic amount is equal to or higher than the lower limit, the ability to suppress void generation is likely to be enhanced.

In measurement by DSC of the polyamide (PA2), the ratio of the endothermic amount in a range of 160° C. or higher and 200° C. or lower is preferably 30% or more, more preferably 40% or more, and furthermore preferably 45% or more with respect to the total endothermic amount in a range of 50° C. or higher and 200° C. or lower.

An upper limit of the ratio of the endothermic amount is not particularly limited as long as the effect of the invention is exhibited, and may be 80% or less, 70% or less, or 60% or less.

The ratio of the endothermic amount is preferably 30% or more and 80% or less, more preferably 40% or more and 80% or less, and further more preferably 45% or more and 80% or less. Alternatively, the ratio of the endothermic amount is preferably 30% or more and 70% or less, more preferably 40% or more and 70% or less, and further more preferably 45% or more and 70% or less. In measurement by DSC of the polyamide (PA2), as the ratio of the endothermic amount in a range of 160° C. or higher and 200° C. or lower is equal to or more than the lower limit, it is possible to sufficiently suppress heating sagging during reflow. In particular, even in a case where a preheating temperature is raised, for example, even in a case where the preheating temperature is 190° C. or higher, or even 200° C. or higher, it is possible to suppress heating sagging. In the present specification, the endothermic amount of the polyamide can be calculated from a peak area of the DSC curve of the polyamide.

In measurement by DSC of the polyamide (PA2), the ratio of the endothermic amount in a range of 50° C. or higher and 150° C. or lower is preferably 80% or less, more preferably 60% or less, and further more preferably 50% or less with respect to the total endothermic amount in the range of 50° C. or higher and 200° C. or lower.

The lower limit of the ratio of the endothermic amount is not particularly limited as long as the effect of the invention is exhibited, and may be, for example, 10% or more, 20% or more, or 30% or more.

The ratio of the endothermic amount is preferably 10% or more and 80% or less, more preferably 10% or more and 60% or less, and further more preferably 10% or more and 50% or less. Alternatively, the ratio of the endothermic amount is preferably 20% or more and 80% or less, more preferably 20% or more and 60% or less, and further more preferably 20% or more and 50% or less.

In measurement by DSC of the polyamide (PA2), the ratio of the endothermic amount in a range of 50° C. or higher and 180° C. or lower is preferably 95% or less, more preferably 90% or less, and further more preferably 85% or less with respect to the total endothermic amount in a range of 50° C. or higher and 200° C. or lower.

The lower limit of the ratio of the endothermic amount is not particularly limited as long as the effect of the invention is exhibited, and, for example, may be 40% or more, 50% or more, or 60% or more.

The ratio of the endothermic amount is preferably 40% or more and 95% or less, more preferably 40% or more and 90% or less, and further more preferably 40% or more and 85% or less. Alternatively, the ratio of the endothermic amount is preferably 50% or more and 95% or less, more preferably 50% or more and 90% or less, and further more preferably 50% or more and 85% or less.

The polyamide (PA2) has one or two or more endothermic peaks in a temperature range of 120° C. or higher and 200° C. or lower as measured by DSC.

In a case where the number of endothermic peaks is one, the temperature of the endothermic peak is preferably 150° C. or higher and 200° C. or lower, more preferably 160° C. or higher and 200° C. or lower, further more preferably 170° C. or higher and 200° C. or lower, and particularly preferably 180° C. or higher and 200° C. or lower.

In a case where the number of endothermic peaks is 2 or more, for example, the lowest temperature of the endothermic peaks of the polyamide (PA2) may be in a range of 120° C. or higher and 200° C. or lower, the highest temperature of the endothermic peaks may be in a range of 120° C. or higher and 200° C. or lower, and all the endothermic peaks may be in a range of 120° C. or higher and 200° C. or lower.

The temperature of the highest temperature of the endothermic peaks is preferably 150° C. or higher and 200° C. or lower, more preferably 160° C. or higher and 200° C. or lower, further more preferably 170° C. or higher and 200° C. or lower, and particularly preferably 180° C. or higher and 200° C. or lower.

In a DSC curve, the polyamide (PA2) preferably has three endothermic peaks consisting of a first endothermic peak, a second endothermic peak, and a third endothermic peak.

A temperature of the first endothermic peak is preferably less than 150° C., more preferably 120° C. or higher and 140° C. or lower, further more preferably 125° C. or higher and 135° C. or lower, and particularly preferably 125° C. or higher and 130° C. or lower.

The temperature of the second endothermic peak is preferably 150° C. or higher, more preferably 155° C. or higher and 175° C. or lower, further more preferably 160° C. or higher and 170° C. or lower, and particularly preferably 162° C. or higher and 167° C. or lower.

The temperature of the third endothermic peak is preferably 150° C. or higher, more preferably 180° C. or higher and 196° C. or lower, further more preferably 183° C. or higher and 195° C. or lower, and particularly preferably 185° C. or higher and 193° C. or lower.

In a case where the polyamide (PA2) is a condensate of an aliphatic dicarboxylic acid, a hydroxy group-containing aliphatic monocarboxylic acid, and an aliphatic diamine, the molar ratio of these raw materials preferably satisfies the following relational expression.

Here, the aliphatic dicarboxylic acid, the hydroxy group-containing aliphatic monocarboxylic acid, and the aliphatic diamine, which are used as raw materials of the polyamide (PA2), are denoted as X mole, Y mole, and Z mole, respectively.

A total number of moles of amino groups in the compound contained in the raw materials is equal to the total number of moles of carboxyl groups, or the total number of moles of amino groups in the compound contained in the raw materials is preferably less than the total number of moles of carboxyl groups. Specifically, it is preferable to satisfy $2Z \leq 2X+Y$.

The molar ratio relationship between the raw materials is preferably $0.2Y \leq X \leq 2Y$, and more preferably $0.4Y \leq X \leq 1.5Y$.

The molar ratio relationship between the raw materials is preferably $0.5Y \leq Z \leq 2Y$, and more preferably $0.8Y \leq Z \leq 1.8Y$.

The amount of the polyamide (PA2) is preferably 0.5% by mass or more and 20% by mass or less, more preferably 1% by mass or more and 20% by mass or less, further more preferably 2% by mass or more and 20% by mass or less, particularly preferably 5% by mass or more and 20% by mass or less, and most preferably 15% by mass or more and 20% by mass or less with respect to the total amount (100% by mass) of the flux.

<Other Components>

In addition, the flux of such other embodiments may further include other components in addition to the rosin, the solvent, the specific thixotropic agent, and the activator.

As the other components, a thixotropic agent other than the polyamide (PA2), a surfactant, a silane coupling agent, a colorant, and the like are exemplary examples.

As the other thixotropic agents, an amide-based thixotropic agent other than the polyamide (PA2), a wax-based thixotropic agent, a sorbitol-based thixotropic agent, and the like are exemplary examples.

For the other thixotropic agents, one type may be used alone, or two or more types may be mixed together and used.

The total amount of the amide-based thixotropic agent in the flux is preferably 0.5% by mass or more and 30% by mass or less, more preferably 0.5% by mass or more and 20% by mass or less, and further more preferably 5% by mass or more and 20% by mass or less with respect to the total amount (100% by mass) of the flux.

The amount of the wax-based thixotropic agent in the flux is preferably 0% by mass or more and 10% by mass or less, more preferably 2% by mass or more and 7% by mass or less, further more preferably 3% by mass or more and 6% by mass or less with respect to the total amount (100% by mass) of the flux.

The amount of the wax-based thixotropic agent in the flux is preferably 12% by mass or more and 100% by mass or less, more preferably 18% by mass or more and 100% by mass or less, further more preferably 33% by mass or more and 100% by mass or less, and particularly preferably 60% by mass or more and 100% by mass or less with respect to the total amount (100% by mass) of the amide-based thixotropic agent and the wax-based thixotropic agent.

The amount of the sorbitol-based thixotropic agent in the flux is preferably 0% by mass or more and 5.0% by mass or less, and more preferably 0% by mass or more and 3.5% by mass or less with respect to the total amount (100% by mass) of the flux.

In the flux of such other embodiments, since the polyamide (PA2) contained in the flux melts at 190° C. and 195° C. and has sufficiently high fluidity, it is possible to sufficiently suppress generation of voids.

In addition, in the flux of such other embodiments, since the polyamide (PA2) contained in the flux does not partially melt at 150° C. and 180° C., it is possible to sufficiently suppress heating sagging. In particular, even in a case where a preheating temperature is raised, for example, even in a case where the preheating temperature is 190° C. or higher, or even 200° C. or higher, it is possible to suppress heating sagging.

(Solder Paste)

Other embodiments of the solder paste contain solder alloy powder and the flux of such other embodiments.

The solder alloy powder may be constituted of solder powders of Sn single body, or solder alloy powder obtained by adding Sb, Bi, In, Cu, Zn, As, Ag, Cd, Fe, Ni, Co, Au, Ge, P, and the like to Sn—Ag-based, Sn—Cu-based, Sn—Ag—Cu-based, Sn—Bi-based, and Sn—In-based powders, or alloys of these.

The solder alloy powders may be constituted of solder alloy powders obtained by adding Sb, Bi, In, Cu, Zn, As, Ag, Cd, Fe, Ni, Co, Au, Ge, and P to the Sn—Pb-based powders, or Sn—Pb-based powders.

The solder alloy powder is preferably Pb-free solders.

Amount of Flux:

In the solder paste of the other embodiments, the amount of the flux is preferably 5% to 30% by mass, and more preferably 5% to 15% by mass with respect to a total mass of the solder paste.

Since the solder paste of the present embodiment contains the flux of such other embodiments, it is possible to sufficiently suppress heating sagging. In addition, it is possible to suppress generation of voids.

EXAMPLES

Hereinafter, the present invention will be described with reference to examples, but the present invention is not limited to the following examples.

<Rosin>

As the rosin, acrylic acid-modified hydrogenated rosin, polymerized rosin, and hydrogenated rosin were used.

<Thixotropic Agent>

As the thixotropic agent, a thixotropic agent A, a thixotropic agent B, a bisamide, and a polyamide were used.

Thixotropic agent A: N,N'-bis(2-stearamidoethyl)-azelicamide

The thixotropic agent A is a compound represented by the following chemical formula (3-1).

As the bisamide, ethylene bis stearamide (product name: Slipax E) was used.

<Activator>

As an organic acid, an adipic acid, an azelaic acid, and a glutaric acid were used.

(3-1)

Thixotropic agent B: N,N'-bis(2-stearamidoethyl)-sebacamide

The thixotropic agent B is a compound represented by the following chemical formula (3-2).

As a halogen-based activator, trans-2,3-dibromo-2-butene-1,4-diol was used.

As an amine, 2-phenylimidazole and 2-phenyl-4-methylimidazole were used.

(3-2)

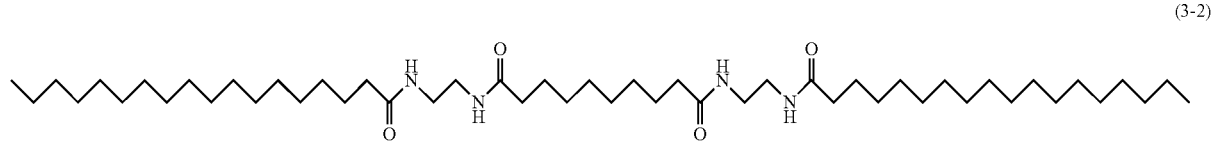 [SMILES: CCCCCCCCCCCCCCCCCC(=O)NCCNC(=O)CCCCCCCCC(=O)NCCNC(=O)CCCCCCCCCCCCCCCCC]

As the polyamide, one obtained by the following method (polyamide (PA1)) was used.

Polyamide Preparation Example 1

12-Hydroxystearic acid and dodecanedioic acid were added and heated to about 100° C., then hexamethylenediamine was added thereto and heated to about 220° C., and held for 3 hours to obtain a polyamide of Preparation Example 1.

Dodecanedioic acid, 12-hydroxystearic acid, and hexamethylenediamine, used as raw materials, are denoted as X mole, Y mole, and Z mole, respectively. The number of moles of raw materials satisfied a relationship of $2Z=2X+Y$.

Polyamide Preparation Example 2

12-Hydroxystearic acid and sebacic acid were added and heated to about 100° C., then hexamethylenediamine was added thereto and heated to about 220° C., and held for 3 hours to obtain a polyamide of Preparation Example 2.

Sebacic acid, 12-hydroxystearic acid, and hexamethylenediamine, used as raw materials, are denoted as X mole, Y mole, and Z mole, respectively. The number of moles of raw materials satisfied a relationship of $2Z=2X+Y$.

The temperature of the endothermic peak of the obtained polyamide was measured by DSC (Differential Scanning Calorimetry).

As a more specific method of measuring an endothermic peak, a temperature raising rate was set to 20° C./min, and a temperature of about 10 mg of polyamide was raised from 25° C. to 350° C. under a nitrogen atmosphere. As a measuring apparatus, DSC7020 (manufactured by Hitachi High-Tech Science) was used. The measurement results are shown in FIG. 1. FIG. 1 is a diagram showing a DSC curve of the obtained polyamide preparation example 1. The temperature of a peak top was defined as the temperature of the endothermic peak.

The obtained polyamide had the temperature of the peak top of all endothermic peaks of 120° C. or higher and 200° C. or lower.

<Solvent>

As a solvent, diethylene glycol monohexyl ether was used.

<Preparation of Flux>

Examples 1 to 15 and Comparative Examples 1 to 4

Each flux of examples and comparative examples was blended using the compositions shown in Tables 1 to 3 below.

The amount of each component in Tables 1 to 3 is % by mass in a case where the total mass of the flux is 100% by mass, and blanks mean 0% by mass.

<Preparation of solder paste>

Each flux of examples and the following solder alloy powder were mixed to blend a solder paste.

As the solder alloy powder, a Sn—Ag—Cu-based solder alloy containing 3.0% by mass of Ag, 0.5% by mass of Cu, and the balance of Sn was used.

As the solder alloy powder, a powder of a size (particle size distribution) satisfying symbol 4 in the powder size classification (Table 2) in JIS Z 3284-1:2014 was used.

In all the blended solder pastes, the flux was 11% by mass, and the solder alloy powder was 89% by mass.

<Evaluation of Print Sagging>

Sagging of the solder paste during printing was evaluated. The results were shown in Tables 1 to 3.

Measurement Method:

Regarding the obtained solder paste, print sagging was evaluated according to the method described in "Test for sagging during printing" of JIS Z 3284-3:2014. The solder paste was printed by using a metal mask arranged with pattern holes shown in I (hole size 3.0×0.7) in FIG. 6 of "Test for sagging during printing" to obtain a test plate.

Regarding the test plate, a minimum interval at which all the printed solder pastes were not coincident was evaluated.

<Evaluation of Heating Sagging>

Sagging during heating of a solder paste obtained by mixing a flux and solder alloy powder was evaluated. The results were shown in Tables 1 to 3.

Measurement Method:

Regarding the obtained solder paste, heating sagging was evaluated according to the method described in "Test for sagging during heating" of JIS Z 3284-3:2014. First, the solder paste was printed by using a metal mask arranged with pattern holes shown in I (hole size 3.0×0.7) in FIG. 6 of "Test for sagging during printing" to obtain a test plate. The obtained test plate was heated to 200° C. in an air circulation heating furnace. Regarding the test plate after heating, a minimum interval at which all the printed solder pastes were not coincident was evaluated.

<Evaluation of Ability to Suppress Heating Sagging>

Determination Criteria:

A: The evaluation value of heating sagging is 0.5 mm or less, or a difference between the evaluation value of heating sagging and the evaluation value of print sagging is 0.2 mm or less.

B: The evaluation value of heating sagging is 0.6 mm or more, or the difference between the evaluation value of heating sagging and the evaluation value of print sagging is 0.3 mm or more.

TABLE 1

| Composition | | | Example 1 | Example 2 | Example 3 | Example 4 | Example 5 | Example 6 | Example 7 |
|---|---|---|---|---|---|---|---|---|---|
| Rosin | | Acrylic acid-modified hydrogenated rosin | 43 | | | 41 | 43 | 43 | 43 |
| | | Polymerized rosin | | 43 | | | | | |
| | | Hydrogenated rosin | | | 43 | | | | |
| Thixotropic agent | | Thixotropic agent A | 5 | 5 | 5 | 1 | 10 | | |
| | | Thixotropic agent B | | | | | | 5 | 1 |
| | | Bisamide | | | | | | | |
| | | Polyamide preparation example 1 | 4.5 | 4.5 | 4.5 | 4.5 | 4.5 | 4.5 | 4.5 |
| | | Polyamide preparation example 2 | | | | | | | |
| Activator | Organic acid | Adipic acid | 1 | 1 | 1 | 1 | 1 | 1 | 1 |
| | | Azelaic acid | 5 | 5 | 5 | 5 | 5 | 5 | 5 |
| | | Glutaric acid | | | | | | | |
| | Halogen-based activator | Trans-2,3-dibromo-2-butene-1,4-diol | 1 | 1 | 1 | 1 | 1 | 1 | 1 |
| | Amine | 2-Phenylimidazole | 0.5 | 0.5 | 0.5 | 0.5 | 0.5 | 0.5 | 0.5 |
| | | 2-Phenyl-4-methylimidazole | 0.5 | 0.5 | 0.5 | 0.5 | 0.5 | 0.5 | 0.5 |
| Solvent | | Diethylene glycol monohexyl ether | 39.5 | 39.5 | 39.5 | 43.5 | 34.5 | 39.5 | 43.5 |
| Total (% by mass) | | | 100 | 100 | 100 | 100 | 100 | 100 | 100 |
| Print sagging (mm) | | | 0.2 | 0.2 | 0.2 | 0.2 | 0.2 | 0.2 | 0.2 |
| Heating sagging (mm) | | | 0.3 | 0.3 | 0.3 | 0.3 | 0.3 | 0.3 | 0.3 |
| Difference between heating sagging and print sagging (mm) | | | 0.1 | 0.1 | 0.1 | 0.1 | 0.1 | 0.1 | 0.1 |
| Ability to suppress heating sagging | | | A | A | A | A | A | A | A |

TABLE 2

| Composition | | | Example 8 | Example 9 | Example 10 | Example 11 | Example 12 | Example 13 | Example 14 | Example 15 |
|---|---|---|---|---|---|---|---|---|---|---|
| Rosin | | Acrylic acid-modified hydrogenated rosin | 43 | 30 | 50 | 43 | 43 | 43 | 43 | 43 |
| | | Polymerized rosin | | | | | | | | |
| | | Hydrogenated rosin | | | | | | | | |
| Thixotropic agent | | Thixotropic agent A | | 5 | 5 | 0.5 | 5 | 5 | 5 | 5 |
| | | Thixotropic agent B | 10 | | | 0.5 | 5 | | | |
| | | Bisamide | | | | | | | 2 | |
| | | Polyamide preparation example 1 | 4.5 | 4.5 | 4.5 | 4.5 | 4.5 | 3 | 4.5 | |
| | | Polyamide preparation example 2 | | | | | | | | 4.5 |
| Activator | Organic acid | Adipic acid | 1 | 1 | 1 | 1 | 1 | 1 | | 1 |
| | | Azelaic acid | 5 | 5 | 5 | 5 | 5 | 5 | | 5 |
| | | Glutaric acid | | | | | | | 6 | |
| | Halogen-based activator | Trans-2,3-dibromo-2-butene-1,4-diol | 1 | 1 | 1 | 1 | 1 | 1 | 1 | 1 |

TABLE 2-continued

| Composition | | Example 8 | Example 9 | Example 10 | Example 11 | Example 12 | Example 13 | Example 14 | Example 15 |
|---|---|---|---|---|---|---|---|---|---|
| Amine | 2-Phenylimidazole | 0.5 | 0.5 | 0.5 | 0.5 | 0.5 | 0.5 | 0.5 | 0.5 |
| | 2-Phenyl-4-methylimidazole | 0.5 | 0.5 | 0.5 | 0.5 | 0.5 | 0.5 | 0.5 | 0.5 |
| Solvent | Diethylene glycol monohexyl ether | 34.5 | 52.5 | 32.5 | 43.5 | 34.5 | 39 | 39.5 | 39.5 |
| Total (% by mass) | | 100 | 100 | 100 | 100 | 100 | 100 | 100 | 100 |
| Print sagging (mm) | | 0.2 | 0.3 | 0.2 | 0.2 | 0.2 | 0.2 | 0.2 | 0.2 |
| Heating sagging (mm) | | 0.3 | 0.5 | 0.3 | 0.3 | 0.3 | 0.3 | 0.3 | 0.3 |
| Difference between heating sagging and print sagging (mm) | | 0.1 | 0.2 | 0.1 | 0.1 | 0.1 | 0.1 | 0.1 | 0.1 |
| Ability to suppress heating sagging | | A | A | A | A | A | A | A | A |

TABLE 3

| Composition | | | Comparative Example 1 | Comparative Example 2 | Comparative Example 3 | Comparative Example 4 |
|---|---|---|---|---|---|---|
| Rosin | Acrylic acid-modified hydrogenated rosin | | 43 | 43 | 43 | 43 |
| | Polymerized rosin | | | | | |
| | Hydrogenated rosin | | | | | |
| Thixotropic agent | Thixotropic agent A | | | 5 | 5 | |
| | Thixotropic agent B | | | | | |
| | Bisamide | | | | 4.5 | 5 |
| | Polyamide preparation example 1 | | 4.5 | | | 4.5 |
| | Polyamide preparation example 2 | | | | | |
| Activator | Organic acid | Adipic acid | 1 | 1 | 1 | 1 |
| | | Azelaic acid | 5 | 5 | 5 | 5 |
| | | Glutaric acid | | | | |
| | Halogen-based activator | Trans-2,3-dibromo-2-butene-1,4-diol | 1 | 1 | 1 | 1 |
| | Amine | 2-Phenylimidazole | 0.5 | 0.5 | 0.5 | 0.5 |
| | | 2-Phenyl-4-methylimidazole | 0.5 | 0.5 | 0.5 | 0.5 |
| Solvent | Diethylene glycol monohexyl ether | | 44.5 | 44.0 | 39.5 | 39.5 |
| Total (% by mass) | | | 100 | 100 | 100 | 100 |
| Print sagging (mm) | | | 0.3 | 0.3 | 0.3 | 0.3 |
| Heating sagging (mm) | | | 0.6 | 0.7 | 0.7 | 0.6 |
| Difference between heating sagging and print sagging (mm) | | | 0.3 | 0.4 | 0.4 | 0.3 |
| Ability to suppress heating sagging | | | B | B | B | B |

As shown in Example 1, a flux, in which acrylic acid-modified hydrogenated rosin is included as rosin, a thixotropic agent A and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 2, a flux, in which the type of the rosin is changed, polymerized rosin is included, a thixotropic agent A and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have a sufficient ability to suppress heating sagging.

As shown in Example 3, a flux, in which the type of the rosin is changed, hydrogenated rosin is included, a thixotropic agent A and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 4, a flux, in which acrylic acid-modified hydrogenated rosin is included as rosin, the amount of a thixotropic agent A is reduced, and polyamide (Preparation Example 1) is included, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 5, a flux, in which acrylic acid-modified hydrogenated rosin is included as rosin, the amount of the thixotropic agent A is increased, polyamide (Preparation Example 1) is included, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 6, a flux, in which acrylic acid-modified hydrogenated rosin is included as rosin, the type of the thixotropic agent is changed, a thixotropic agent B and polyamide (Preparation Example 1) are included, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 7, a flux, in which acrylic acid-modified hydrogenated rosin is included as rosin, the amount of the thixotropic agent B is reduced, polyamide (Preparation Example 1) is included, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 8, a flux, in which acrylic acid-modified hydrogenated rosin is included as rosin, the amount of the thixotropic agent B is increased, polyamide (Preparation Example 1) is included, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 9, a flux, in which the amount of the acrylic acid-modified hydrogenated rosin is reduced, a thixotropic agent A and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 10, a flux, in which the amount of the acrylic acid-modified hydrogenated rosin is included, a thixotropic agent A and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 11, a flux, in which acrylic acid-modified hydrogenated rosin is included as rosin, a thixotropic agent A, thixotropic agent B, and polyamide (Preparation Example 1) are included as thixotropic agents, the total amount of the thixotropic agent A and the thixotropic agent B is reduced, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 12, a flux, in which acrylic acid-modified hydrogenated rosin is included as rosin, a thixotropic agent A, a thixotropic agent B, and polyamide (Preparation Example 1) are included as thixotropic agents, the total amount of the thixotropic agent A and thixotropic agent B is increased, an adipic acid, an azelaic acid, a trans-2,3-dibromo-2-butene-1,4-diol, 2-phenylimidazole, and a 2-phenyl-4-methylimidazole are included as activators, and diethylene glycol monohexyl ether is included as a solvent, could have sufficient ability to suppress heating sagging.

As shown in Example 13, a flux, in which acrylic acid-modified hydrogenated rosin is included as rosin, a thixotropic agent A, bisamide, and polyamide (Preparation Example 1) are included as thixotropic agents, an adipic acid, an azelaic acid, a trans-2,3-dibromo-2-butene-1,4-diol, 2-phenylimidazole, and 2-phenyl-4-methylimidazole are included as activators, and diethylene glycol monohexyl ether is included as a solvent, could have sufficient ability to suppress heating sagging.

As shown in Example 14, a flux, in which acrylic acid-modified hydrogenated rosin is included as rosin, a thixotropic agent A and polyamide (Preparation Example 1) are included as thixotropic agents, a glutaric acid, a trans-2,3-dibromo-2-butene-1,4-diol, 2-phenylimidazole, and 2-phenyl-4-methylimidazole are included as activators, diethylene glycol monohexyl ether is included as a solvent, could have sufficient ability to suppress heating sagging.

As shown in Example 15, a flux, in which acrylic acid-modified hydrogenated rosin is included as rosin, a thixotropic agent A and polyamide (Preparation Example 2) are included as thixotropic agents, an adipic acid, an azelaic acid, a trans-2,3-dibromo-2-butene-1,4-diol, 2-phenylimidazole, and 2-phenyl-4-methylimidazole and are included, and diethylene glycol monohexyl ether is included as a solvent, could have sufficient ability to suppress heating sagging.

The fluxes of Examples 1 to 14 include a compound represented by General Formula (1) and polyamide (Preparation Example 1), and thus could have sufficient ability to suppress heating sagging at 200° C.

The flux of Example 15 includes a compound represented by General Formula (1) and polyamide (Preparation Example 2), and thus could have sufficient ability to suppress heating sagging at 200° C. On the other hand, the fluxes of Comparative Examples 1 and 4 did not contain the thixotropic agent A and the thixotropic agent B, and had insufficient ability to suppress heating sagging at 200° C.

In addition, the fluxes of Comparative Examples 2 and 3 did not contain polyamide (Preparation Example 1) and polyamide (Preparation Example 2), and had insufficient ability to suppress heating sagging at 200° C.

From these results, it has been clarified that by including the compound represented by General Formula (1) and the polyamide, it is possible to obtain sufficient ability to suppress heating sagging.

As shown below, the polyamide of Preparation Example 1 and the polyamide of Preparation Example 2 were prepared. Using these polyamides, a flux and a solder paste were prepared and evaluated for heating sagging and generation of voids.

As the polyamide, one obtained by the following method (polyamide (PA2)) was used.

Polyamide Preparation Example 1

12-Hydroxystearic acid and dodecanedioic acid were added and heated to about 100° C., then hexamethylenediamine was added thereto and heated to about 220° C., and held for 3 hours to obtain a polyamide of Preparation Example 1.

Dodecanedioic acid, 12-hydroxystearic acid, and hexamethylenediamine, used as raw materials, are denoted as X mole, Y mole, and Z mole, respectively. The number of moles of raw materials satisfied a relationship of 2Z=2X+Y.

Polyamide Preparation Example 2

12-Hydroxystearic acid and sebacic acid were added and heated to about 100° C., then hexamethylenediamine was added thereto and heated to about 220° C., and held for 3 hours to obtain a polyamide of Preparation Example 2.

Sebacic acid, 12-hydroxystearic acid, and hexamethylenediamine, used as raw materials, are denoted as X mole, Y mole, and Z mole, respectively. The number of moles of raw materials satisfied a relationship of 2Z=2X+Y <Measurement of Endothermic Peak>

The endothermic peak temperatures of the polyamides of Preparation Examples 1 and 2 were measured by DSC (Differential Scanning Calorimetry).

As a more specific method of measuring an endothermic peak, measurement was performed by setting a temperature raising rate to 20° C./min, and raising a temperature of about 7 mg of each of the polyamides of Preparation Examples 1 and 2 was raised from 30° C. to 220° C. under a nitrogen atmosphere. As a measuring apparatus, DSC7020 (manufactured by Hitachi High-Tech Science) was used. A temperature of a peak top was defined as the temperature of the endothermic peak.

Figure 2:
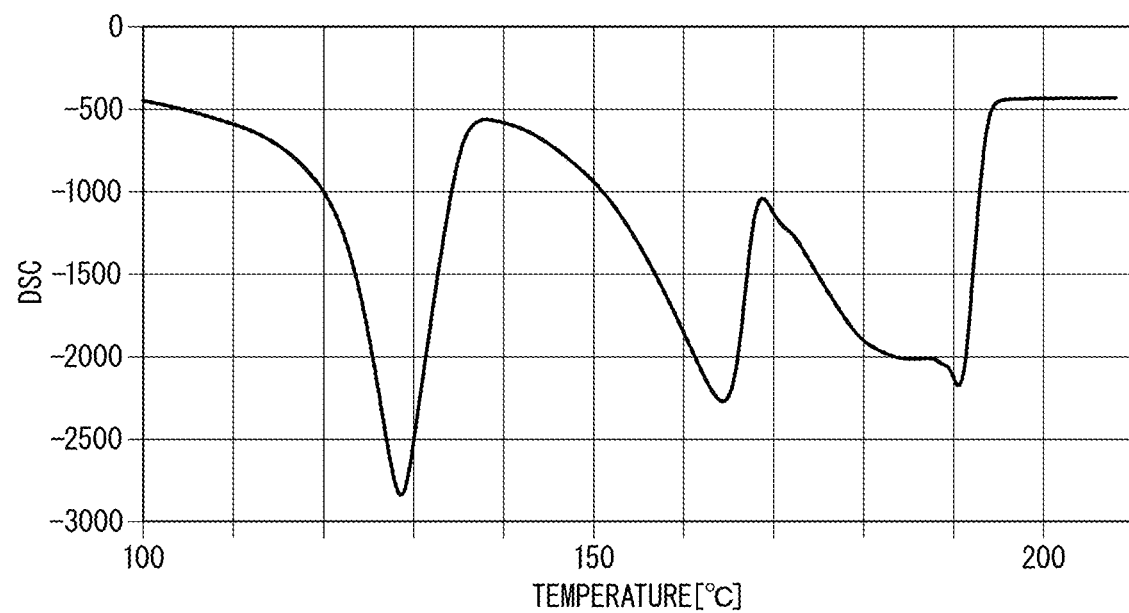
FIG. 2 is a graph showing the DSC curve of the polyamide of Preparation Example 1.
Figure 3:
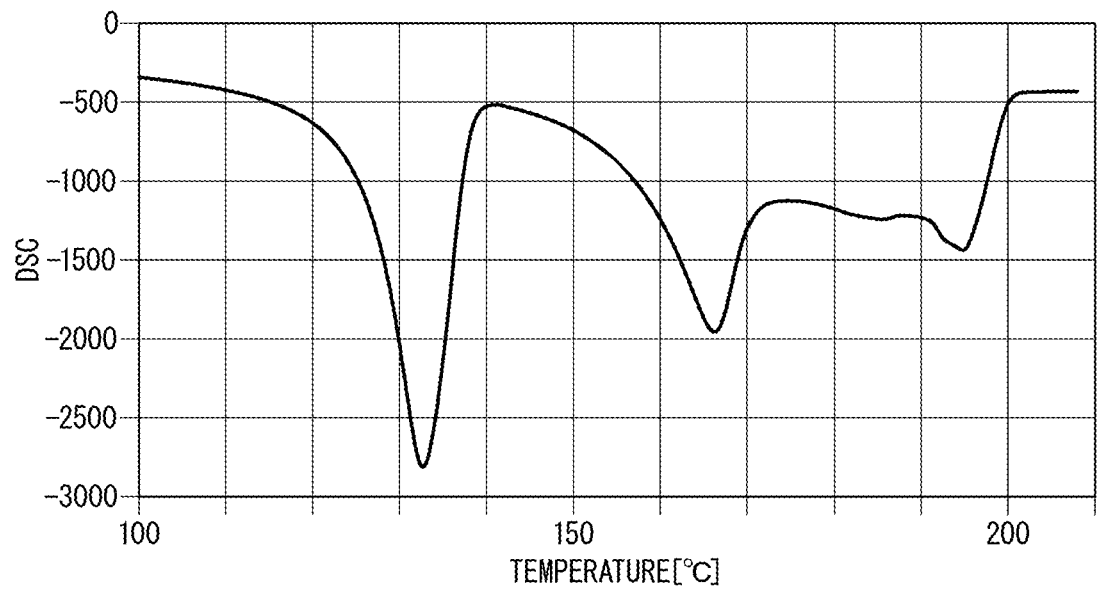
FIG. 3 is a graph showing the DSC curve of the polyamide of Preparation Example 2.

Measurement results are shown in FIGS. 2 and 3.

FIG. 2 shows an endothermic peak of the polyamide of Preparation Example 1, and FIG. 3 shows an endothermic peak of the polyamide of Preparation Example 2.

<Evaluation of Ratio of Endothermic Amount>

For the polyamides of Preparation Examples 1 and 2, the ratio of an endothermic amount at a certain specific temperature was calculated as follows.

The endothermic amount of the polyamide was calculated from a peak area of the DSC curve of the polyamide.

Here, the "ratio of an endothermic amount at a certain specific temperature" means an endothermic amount in a range of 50° C. or higher and a specific temperature or lower with respect to a total endothermic amount in a range of 50° C. or higher and 200° C. or lower. The results are shown in FIGS. 4 to 7.

Figure 4:
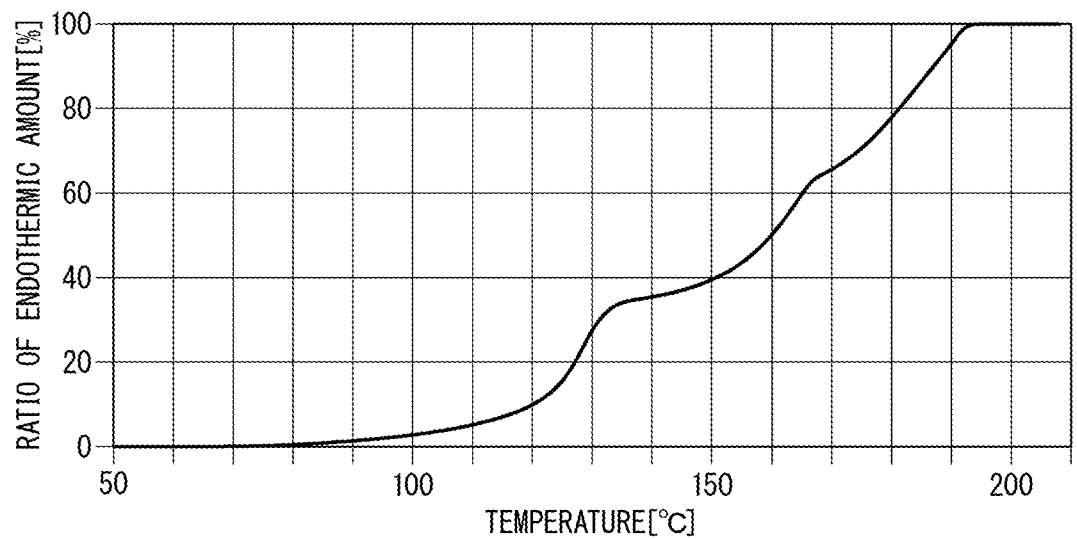
FIG. 4 is a graph showing a relationship between the ratio of an endothermic amount of the polyamide of Preparation Example 1 and the temperature.
Figure 5:
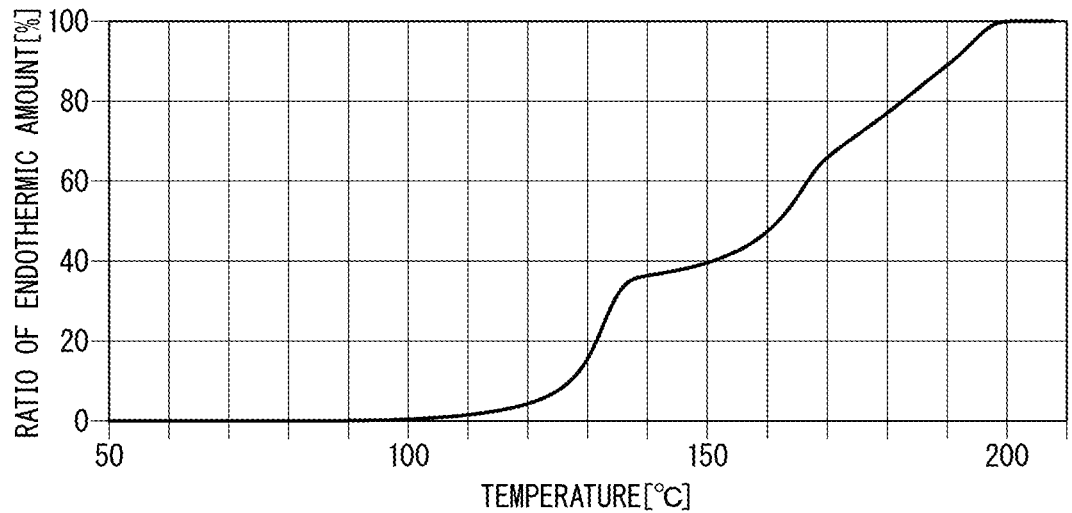
FIG. 5 is a graph showing a relationship between the ratio of an endothermic amount of the polyamide of Preparation Example 2 and the temperature.
Figure 6:
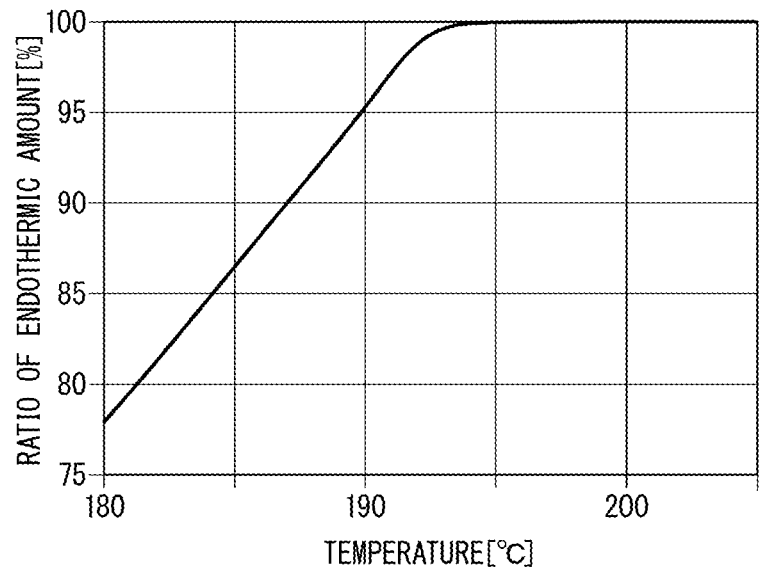
FIG. 6 is a graph showing the relationship between the ratio of the endothermic amount of the polyamide of Preparation Example 1 and the temperature, which is a partially enlarged one of FIG. 4.

FIG. 4 is a graph showing a relationship between the ratio of an endothermic amount of the polyamide and a temperature of Preparation Example 1, and FIG. 5 is a graph showing a relationship between the ratio of an endothermic amount of the polyamide and a temperature of Preparation Example 2. FIG. 6 is a graph showing the relationship between the ratio of the endothermic amount of the polyamide and the temperature of Preparation Example 1, which is a partially enlarged one of FIG. 4.

Figure 7:
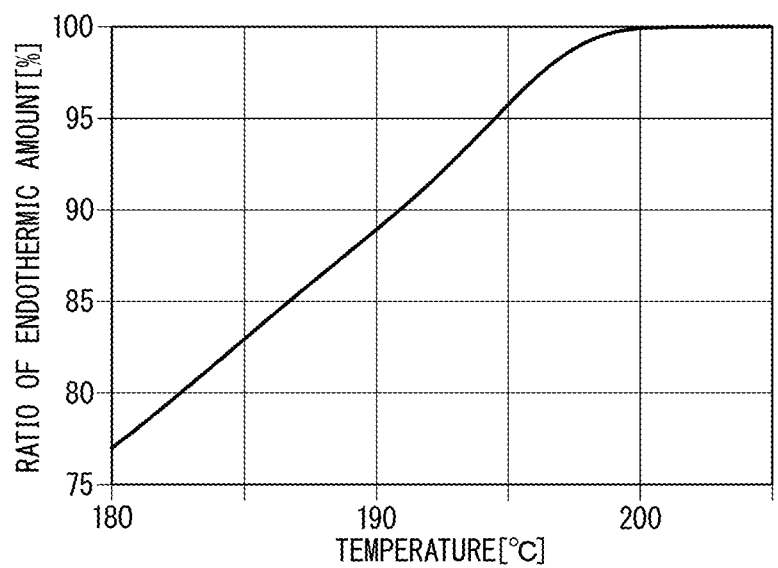
FIG. 7 is a graph showing the relationship between the ratio of the endothermic amount of the polyamide of Preparation Example 2 and the temperature, which is a partially enlarged one of FIG. 5.

FIG. 7 is a graph showing the relationship between the ratio of the endothermic amount of the polyamide and the temperature of Preparation Example 2, which is a partially enlarged one of FIG. 5.

The polyamide of Preparation Example 1 had the ratio of an endothermic amount of 90% or more at 190° C. and the ratio of an endothermic amount of 98% or more at 195° C.

On the other hand, the polyamide of Preparation Example 2 had the ratio of an endothermic amount of less than 90% at 190° C. and the ratio of an endothermic amount of less than 98% at 195° C.

It was clarified that the ratio of the endothermic amount of the polyamide of Preparation Example 1 at 195° C. or higher and 200° C. or lower was smaller than that of the ratio of the endothermic amount of the polyamide of Preparation Example 2 at 195° C. or higher and 200° C. or lower.

<Rosin>

As the rosin, acrylic acid-modified hydrogenated rosin, polymerized rosin, and hydrogenated rosin were used.

<Thixotropic Agent>

As a thixotropic agent, the polyamides of Preparation Examples 1 and 2, hexamethylenebishydroxystearic acid amide, and hardened castor oil were used.

<Activator>

As an organic acid, an adipic acid, a suberic acid, and a hydrogenated dimer acid were used.

As a halogen-based activator, trans-2,3-dibromo-2-butene-1,4-diol was used.

As an amine, 2-phenylimidazole was used.

<Solvent>

As a solvent, diethylene glycol monohexyl ether was used.

<Preparation of flux>

Test Examples 1 to 14

Each flux of the test example was blended with the composition shown in Table 4 below.

The fluxes of Test Examples 1 to 13 contain rosin, a solvent, a polyamide (PA2), and an activator.

The flux of Test Example 14 contains rosin, a solvent, and an activator, but does not contain a polyamide (PA2).

The amount of each component in Table 4 is % by mass in a case where the total mass of the flux is 100% by mass, and blanks mean 0% by mass.

<Preparation of Solder Paste>

Each flux of examples and the following solder alloy powder were mixed to blend a solder paste.

As the solder alloy powder, a Sn—Ag—Cu-based solder alloy containing 3.0% by mass of Ag, 0.5% by mass of Cu, and the balance of Sn was used.

As the solder alloy powder, a powder of a size (particle size distribution) satisfying symbol 4 in the powder size classification (Table 2) in JIS Z 3284-1:2014 was used.

In all the blended solder pastes, the flux was 11% by mass, and the solder alloy powder was 89% by mass.

<Evaluation of Heating Sagging>

Sagging during heating of a solder paste obtained by mixing a flux and solder alloy powder was evaluated.

Measurement Method:

Regarding the obtained solder paste, heating sagging was evaluated according to the method described in "Test for sagging during heating" of JIS Z 3284-3:2014. First, the solder paste was printed by using a metal mask arranged with pattern holes shown in I (hole size 3.0×0.7) in FIG. 6 and II (hole size 3.0×1.5) in FIG. 6 of "Test for sagging during printing" to obtain a test plate. The obtained test plate was heated to 150° C. or 200° C. in an air circulation heating furnace. Regarding the test plate after heating, a minimum interval (unit is mm) at which all the printed solder pastes were not coincident was evaluated. The results were shown in Table 4.

<Evaluation of Void Generation>

A solder paste was printed on a substrate (CU-OSP-treated glass epoxy substrate) using a metal mask (opening diameter 0.30 mm, mask thickness 0.12 mm), and LGA (Land Grid Array: terminal-treated Au flash, pitch: 0.5 mm, φ: 0.3 mm, number of bumps: 160) was mounted.

Subsequently, a temperature was raised from 40° C. to 150° C. at 3° C. to 4° C./sec by atmospheric reflow, the solder paste was held at 150° C. to 175° C. for 80 to 90 seconds, then the temperature was raised to 175° C. to 240° C. at 1° C. to 2° C./sec, and held at 220° C. or higher for 35 to 45 seconds.

Subsequently, an LGA mounting portion was imaged using an X-ray observation device (TUX-3200 manufactured by Mars Tohken Solution Co., Ltd.). Data were similarly acquired for 3 LGAs (a total of 480 bumps).

Regarding each of the 480 bumps, the ratio of the total area of voids to the land area of the bumps was calculated. An average value of the obtained ratios was calculated and used as a void area ratio. The results were shown in Table 4.

In addition, the ratio of the number of bumps having no void with respect to the total number of bumps (480) was calculated, and this was used as a void non-generation ratio. The results were shown in Table 4.

Determination Criteria of Void Area Ratio:
A: The void area ratio is 1.2% or less.
B: The void area ratio is more than 1.2%.
Determination Criteria of Void Non-Generation Ratio:
A: The void non-generation ratio is 35% or more.
B: The void non-generation ratio is less than 35%.

TABLE 4

| | Composition | | Test Example 1 | Test Example 2 | Test Example 3 | Test Example 4 | Test Example 5 | Test Example 6 | Test Example 7 |
|---|---|---|---|---|---|---|---|---|---|
| Rosin | | Acrylic acid-modified hydrogenated rosin | 40 | | | 30 | 30 | 40 | 40 |
| | | Hydrogenated rosin | | 40 | | | | | |
| | | Polymerized rosin | | | 40 | | | | |
| | Acrylic resin | | | | | 10 | | | |
| Thixotropic agent | | Polyamide preparation example 1 | 5 | 5 | 5 | 6 | 6 | 5 | 0.5 |
| | | Polyamide preparation example 2 | | | | | | | |
| | | Hexamethylene-bishydroxystearic acid amide | | | | | | | |
| | | Hardened castor oil | 3 | 3 | 3 | 3 | 3 | 3 | 7.5 |
| Activator | Organic acid | Adipic acid | 1 | 1 | 1 | 1 | 1 | 3 | 1 |
| | | Suberic acid | 1 | 1 | 1 | 1 | 1 | 4 | 1 |
| | | Hydrogenated dimer acid | | | | | | 10 | |
| | Halogen-based activator | Trans-2,3-dibromo-2-butene-1,4-diol | 2 | 2 | 2 | 2 | 2 | | 2 |
| | Amine | 2-Phenylimidazole | | | | | | 3 | |
| Solvent | | Diethylene glycol monohexyl ether | 48 | 48 | 48 | 47 | 47 | 42 | 48 |
| Sum (% by mass) | | | 100 | 100 | 100 | 100 | 100 | 100 | 100 |
| Heating sagging (150° C.) | 3.0 × 0.7 | | 0.3 | 0.4 | 0.3 | 0.3 | 0.3 | 0.3 | 1.0 |
| | 3.0 × 1.5 | | 0.3 | 0.4 | 0.3 | 0.3 | 0.3 | 0.3 | 0.9 |
| Heating sagging (200° C.) | 3.0 × 0.7 | | 0.3 | 0.4 | 0.3 | 0.4 | 0.4 | 0.3 | 1.0 |
| | 3.0 × 1.5 | | 0.3 | 0.4 | 0.3 | 0.4 | 0.4 | 0.3 | 1.0 |
| Void area ratio | | | A | A | A | A | A | A | A |
| Void non-generation ratio | | | A | A | A | A | A | A | A |

| | Composition | | Test Example 8 | Test Example 9 | Test Example 10 | Test Example 11 | Test Example 12 | Test Example 13 | Test Example 14 |
|---|---|---|---|---|---|---|---|---|---|
| Rosin | | Acrylic acid-modified hydrogenated rosin | 40 | 30 | 30 | 40 | 40 | 40 | 40 |
| | | Hydrogenated rosin | | | | | | | |
| | | Polymerized rosin | | | | | | | |
| | Acrylic resin | | | | | | | | |
| Thixotropic agent | | Polyamide preparation example 1 | 1 | 15 | 20 | 1.5 | 2 | | |
| | | Polyamide preparation example 2 | | | | | | 5 | |
| | | Hexamethylene-bishydroxystearic acid amide | | | | | | | 5 |

TABLE 4-continued

| | | | | | | | | | |
|---|---|---|---|---|---|---|---|---|---|
| | | Hardened castor oil | 7 | | | 6.5 | 6 | 3 | 3 |
| Activator | Organic acid | Adipic acid | 1 | 1 | 1 | 1 | 1 | 1 | 1 |
| | | Suberic acid | 1 | 1 | 1 | 1 | 1 | 1 | 1 |
| | | Hydrogenated dimer acid | | | | | | | |
| | Halogen-based activator | Trans-2,3-dibromo-2-butene-1,4-diol | 2 | 2 | 2 | 2 | 2 | 2 | 2 |
| | Amine | 2-Phenylimidazole | | | | | | | |
| Solvent | | Diethylene glycol monohexyl ether | 48 | 51 | 46 | 48 | 48 | 48 | 48 |
| Sum (% by mass) | | | 100 | 100 | 100 | 100 | 100 | 100 | 100 |
| Heating sagging (150° C.) | 3.0 × 0.7 | | 0.7 | 0.2 | 0.2 | 0.6 | 0.5 | 0.3 | 0.7 |
| | 3.0 × 1.5 | | 0.6 | 0.2 | 0.2 | 0.5 | 0.4 | 0.3 | 0.7 |
| Heating sagging (200° C.) | 3.0 × 0.7 | | 0.9 | 0.2 | 0.2 | 0.7 | 0.5 | 0.3 | 0.9 |
| | 3.0 × 1.5 | | 0.8 | 0.2 | 0.2 | 0.6 | 0.4 | 0.3 | 1.0 |
| Void area ratio | | | A | A | A | A | A | B | A |
| Void non-generation ratio | | | A | A | A | A | A | B | A |

Test Examples 1 to 6 and 8 to 13 contained a polyamide of Preparation Example 1, and had sufficient ability to suppress heating sagging at 200° C.

Test Example 14 did not contain a polyamide, and had insufficient ability to suppress heating sagging at 200° C.

Test Examples 1 to 12 contained the polyamide of Preparation Example 1, and had sufficient ability to suppress the generation of voids.

Test Example 13 contained the polyamide of Preparation Example 2, and had insufficient ability to suppress generation of voids.

The polyamide of Preparation Example 1 was prepared using dodecanedioic acid having 12 carbon atoms as a raw material.

The polyamide of Preparation Example 2 was prepared using sebacic acid having 10 carbon atoms as a raw material.

In general, organic compounds such as lipid have a high melting point as the number of carbon atoms increases.

Surprisingly, in the polyamide of Preparation Example 1, since the ratio of an endothermic amount at 50° C. or higher and 190° C. or lower and the ratio of an endothermic amount at 50° C. or higher and 195° C. or lower were sufficiently high, Test Examples 1 to 12 had sufficient ability to suppress generation of voids.

In addition, in the polyamide of Preparation Example 2, since the ratio of an endothermic amount at 50° C. or higher and 190° C. or lower and the ratio of an endothermic amount at 50° C. or higher and 195° C. or lower were not sufficiently high, Test Example 13 had insufficient ability to suppress generation of voids.

In the polyamide of Preparation Example 1, fluidity was sufficiently high at 190° C. and 195° C., it is presumed that Test Examples 1 to 12 had sufficient ability to suppress generation of voids.

In the polyamide of Preparation Example 2, fluidity was not sufficiently high at 190° C. and 195° C., it is presumed that Test Example 13 had insufficient ability to suppress generation of voids.

INDUSTRIAL APPLICABILITY

According to the present invention, it is possible to provide a flux and a solder paste that are capable of sufficiently suppressing heating sagging during reflow. These flux and solder paste can be suitably used for soldering a substrate having a large area.

What is claimed is:
1. A flux comprising:
a rosin;
a solvent;
a thixotropic agent; and
an activator,
wherein the thixotropic agent contains a compound represented by General Formula (3) and a polyamide,
the polyamide is a condensate of an aliphatic carboxylic acid, a hydroxy group-containing aliphatic carboxylic acid, and an amine,
a temperature of an endothermic peak of the polyamide by differential scanning calorimetry is in a range of 120° C. or higher and 200° C. or lower,
the aliphatic carboxylic acid includes a dicarboxylic acid,
an amount of the rosin is in a range of 30% by mass or more and 50% by mass or less with respect to a total mass of the flux,
an amount of the compound represented by General Formula (3) is in a range of 1% by mass or more and 10% by mass or less with respect to a total mass of the flux, and
an amount of the polyamide is in a range of 1% by mass or more and 15% by mass or less with respect to a total mass of the flux,

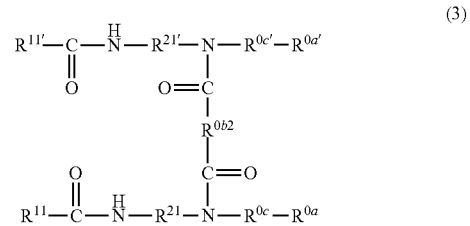

(3)

[in the formula, $R^{11}$ and $R^{11'}$ each independently represent a hydrocarbon group having 14 to 20 carbon atoms, $R^{0a}$ and $R^{0a'}$ each represent a hydrogen atom, $R^{0b2}$ represents a hydrocarbon group having 6 to 9 carbon atoms, $R^{21}$ and $R^{21'}$ each independently represent an alkylene group having 2 to 6 carbon atoms, and $R^{0c}$ and $R^{0c'}$ each represent a single bond].

2. The flux according to claim 1,
wherein the compound represented by General Formula (3) is N,N'-bis(2-stearamidoethyl)-sebacamide or N,N'-bis(2-stearamidoethyl)-azelaicamide.

3. A solder paste comprising:
solder alloy powder; and
the flux according to claim 1.

\* \* \* \* \*